US012598235B2

(12) United States Patent
Zhao et al.

(10) Patent No.: US 12,598,235 B2
(45) Date of Patent: Apr. 7, 2026

(54) METHOD FOR TRANSMITTING CROSS-RESOURCE EVENT NOTIFICATION, ELECTRONIC DEVICE, SYSTEM AND COMPUTER-READABLE STORAGE MEDIUM

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Junjie Zhao, Beijing (CN); Jing Su, Beijing (CN); Qian Zhang, Beijing (CN); Yanqiu Zhao, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 99 days.

(21) Appl. No.: 18/644,863

(22) Filed: Apr. 24, 2024

(65) Prior Publication Data

US 2024/0275851 A1      Aug. 15, 2024

Related U.S. Application Data

(63) Continuation-in-part of application No. 17/763,691, filed as application No. PCT/CN2020/116984 on Sep. 23, 2020, now Pat. No. 12,010,179.

(30) Foreign Application Priority Data

Sep. 29, 2019    (CN) .......................... 201910936059.4

(51) Int. Cl.
  *H04L 67/125*      (2022.01)
  *H04L 67/10*      (2022.01)

(52) U.S. Cl.
  CPC ............ *H04L 67/125* (2013.01); *H04L 67/10* (2013.01)

(58) Field of Classification Search
  CPC .......................... H04L 67/125; H04L 41/0618
  See application file for complete search history.

(56) References Cited

U.S. PATENT DOCUMENTS

| 9,064,389 B1 | 6/2015 | Bernstein |
| 11,012,839 B2 | 5/2021 | Wang et al. |
| (Continued) | | |

FOREIGN PATENT DOCUMENTS

| CN | 105659633 A | 6/2016 |
| CN | 108353094 A | 7/2018 |
| KR | 101845195 B1 | 4/2018 |

OTHER PUBLICATIONS

Kddi et al (hereinafter, Kiddi): "TR-0026-v4.7.0", RDM-2019-0088-TR-026-VEHICULAR_DOMAIN_ENABLEMENT_V4_7_1.ZIP, ONEM2M; vol. WG1—Requirements & Domain Models, RDM, No. conference = RDM42, Sep. 22, 2019-Sep. 27, 2019, India, Hyderabad, India Sep. 12, 2019 (Sep. 12, 2019), pp. 1-206, XP084031825 (Year: 2019).*

(Continued)

*Primary Examiner* — Frantz B Jean
(74) *Attorney, Agent, or Firm* — Chiwin Law LLC

(57)      ABSTRACT

Disclosed are a method for transmitting a cross-resource event notification, an electronic device and a system. The method for transmitting a cross-resource event notification includes: acquiring registration requests of m terminal devices, and creating a resource for each of the m terminal devices, respectively, to obtain m resources, wherein a numerical value of m is an integer greater than or equal to 2; acquiring a cross-resource subscription request from a resource subscription entity, wherein the cross-resource subscription request includes a single-resource event notifica- (Continued)

100A tion criterion for each of the m resources and a cross-resource event notification criterion; and determining that the cross-resource event notification criterion is satisfied in response to n resources among the m resources satisfying respective single-resource event notification criteria, and transmitting the cross-resource event notification to a resource subscription entity, wherein a numerical value of n is a positive integer smaller than the numerical value of m.

16 Claims, 11 Drawing Sheets

(56) References Cited

U.S. PATENT DOCUMENTS

| | | | |
|---|---|---|---|
| 11,356,350 | B2 | 6/2022 | Ly et al. |
| 2014/0340219 | A1 | 11/2014 | Russell et al. |

| | | | | |
|---|---|---|---|---|
| 2015/0295785 | A1 | 10/2015 | Fan | |
| 2020/0288291 | A1* | 9/2020 | Wang | H04W 4/50 |
| 2021/0152653 | A1* | 5/2021 | Guo | H04L 67/566 |

OTHER PUBLICATIONS

First Office Action of the corresponding Japanese Application No. 2022519536, dated Aug. 19, 2024.

Extended European Search Report from European Application No. 20867910.0, mailing date: Aug. 30, 2023 (submitted in IDS in the parent application of U.S. Appl. No. 17/763,691).

Non-patent Literature cited in the EESR: TR-0026-V4.7.0. (submitted in IDS in the parent application of U.S. Appl. No. 17/763,691).

International Search Report of the corresponding PCT/CN2020/116984, in Chinese & English.

First Non-final Office Action of the parent application of U.S. Appl. No. 17/763,691.

\* cited by examiner

100A

200

200

300

400

500

Display-on-screen terminal device 1
Display-on-screen terminal device1 2
Display-on-screen terminal device 3
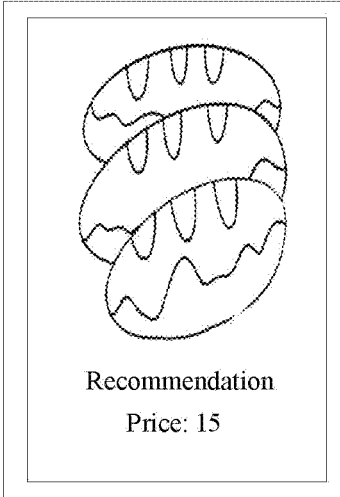
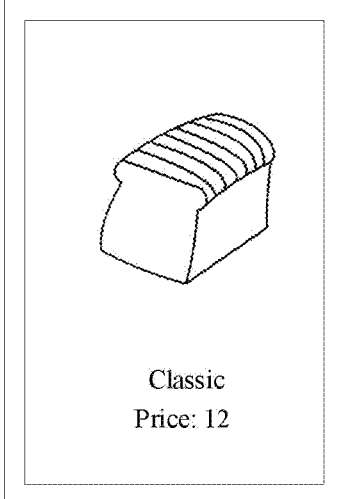
Recommendation
Price: 15
Classic
Price: 12
New product
Price: 12
FIG. 6B
Display-on-screen terminal device 1
Display-on-screen terminal device1 2
Display-on-screen terminal device 3
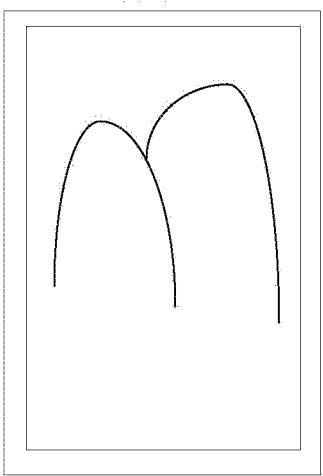
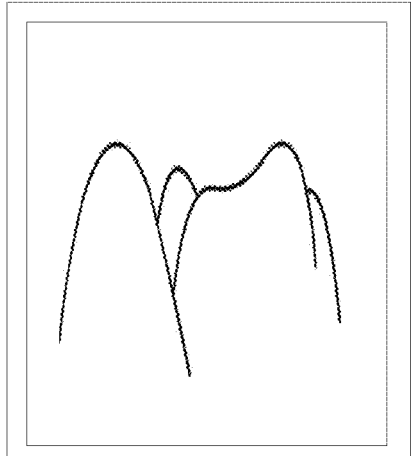
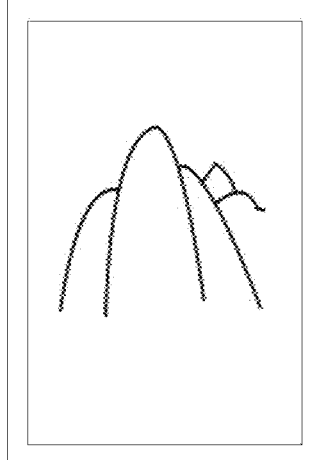
FIG. 6C

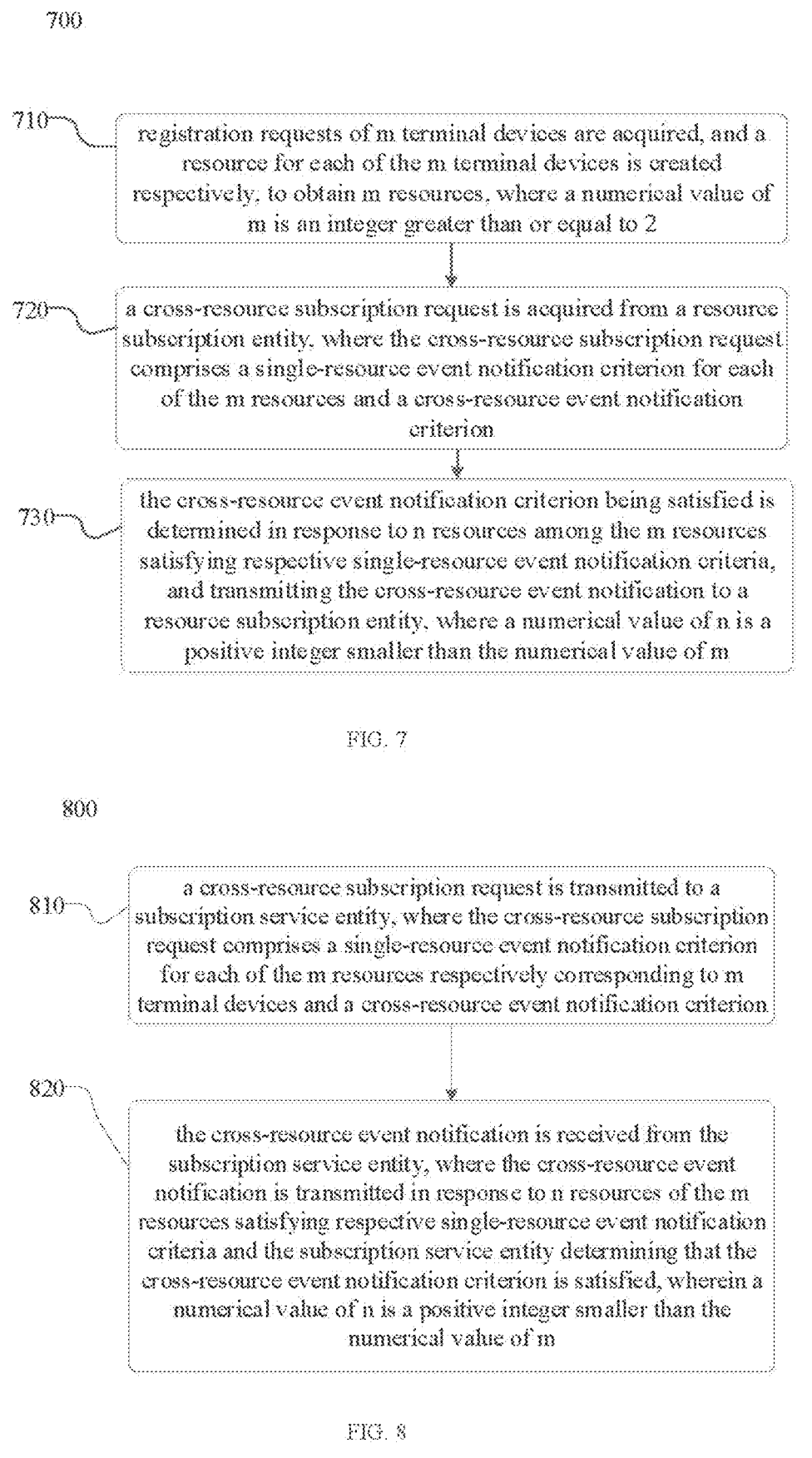

700

710 — registration requests of m terminal devices are acquired, and a resource for each of the m terminal devices is created respectively, to obtain m resources, where a numerical value of m is an integer greater than or equal to 2

720 — a cross-resource subscription request is acquired from a resource subscription entity, where the cross-resource subscription request comprises a single-resource event notification criterion for each of the m resources and a cross-resource event notification criterion 730 — the cross-resource event notification criterion being satisfied is determined in response to n resources among the m resources satisfying respective single-resource event notification criteria, and transmitting the cross-resource event notification to a resource subscription entity, where a numerical value of n is a positive integer smaller than the numerical value of m

810 — a cross-resource subscription request is transmitted to a subscription service entity, where the cross-resource subscription request comprises a single-resource event notification criterion for each of the m resources respectively corresponding to m terminal devices and a cross-resource event notification criterion 820 — the cross-resource event notification is received from the subscription service entity, where the cross-resource event notification is transmitted in response to n resources of the m resources satisfying respective single-resource event notification criteria and the subscription service entity determining that the cross-resource event notification criterion is satisfied, wherein a numerical value of n is a positive integer smaller than the numerical value of m

FIG. 8

1000 cross-resource
subscription unit
1001 notification unit
1002

1100 processor ⌇1101     memory ⌇1102

⌇1103

METHOD FOR TRANSMITTING CROSS-RESOURCE EVENT NOTIFICATION, ELECTRONIC DEVICE, SYSTEM AND COMPUTER-READABLE STORAGE MEDIUM

The present application is a continuation-in-part Application of U.S. patent application Ser. No. 17/763,691, filed on Mar. 25, 2022, which claims the priority to and benefits of Chinese patent application No. 201910936059.4 filed on Sep. 29, 2019. All the aforementioned patent applications are hereby incorporated by reference in their entireties.

TECHNICAL FIELD

The disclosure relates to a method, an electronic device, a system, and a computer-readable storage medium for transmitting cross-resource event notifications.

BACKGROUND

With the development of technologies for the Internet of Things (IoT), more and more IoT devices (also referred to as entities) can get access to the IoT. The IoT manages respective IoT devices by building an IoT management platform. The IoT management platform generates resources corresponding to the IoT devices so as to represent the IoT devices, and controls the IoT devices by operating the corresponding resources. An application terminal may subscribe to notifications for changes in respective resources utilizing the IoT management platform, to achieve further management and control over the IoT devices.

A smart home platform is a common IoT management platform. The physical home appliances are connected in a wired or wireless manner to the smart home platform. The smart home platform generates virtual home appliances (i.e. resources) for the physical home appliances. The application terminal accesses the virtual household appliances through the smart home platform. Therefore, remote monitoring and controlling of the home appliances are achieved.

At present, how multiple pieces of data are processed by IoT is still relatively cumbersome, with processing efficiency not high enough, making it inconvenient for users.

SUMMARY

The embodiments of the present disclosure provide a method, an apparatus, an electronic device, a computer-readable storage medium, and a system for transmitting cross-resource event notifications, which can implement transmitting cross-resource event notifications to a resource subscription entity in a case where any two or more resources of a plurality of resources satisfy a cross-resource event notification criterion, thereby meeting the needs of diverse users and improving processing efficiency for notifications.

The embodiments of the present disclosure provide a method for transmitting cross-resource event notifications, which includes: receiving a cross-resource subscription request from a resource subscription entity, wherein the cross-resource subscription request is used to subscribe to a plurality of resources, and the cross-resource subscription request includes a plurality of single-resource event notification criteria and a cross-resource event notification criterion; determining that n resources of m resources satisfy the single-resource event notification criteria and satisfy the cross-resource event notification criterion, and transmitting a cross-resource event notification to the resource subscription entity, wherein m and n are positive integers greater than or equal to 2.

The embodiments of the present disclosure provide a method for transmitting cross-resource event notifications, which includes: acquiring registration requests of m terminal devices, and creating a resource for each of the m terminal devices, respectively, to obtain m resources, wherein a numerical value of m is an integer greater than or equal to 2; acquiring a cross-resource subscription request from a resource subscription entity, wherein the cross-resource subscription request comprises a single-resource event notification criterion for each of the m resources and a cross-resource event notification criterion; and determining that the cross-resource event notification criterion is satisfied in response to n resources among the m resources satisfying respective single-resource event notification criteria, and transmitting the cross-resource event notification to a resource subscription entity, wherein a numerical value of n is a positive integer smaller than the numerical value of m.

The embodiments of the present disclosure provide a method for receiving cross-resource event notifications, which includes: transmitting a cross-resource subscription request to a subscription service entity, wherein the cross-resource subscription request comprises a single-resource event notification criterion for each of the m resources respectively corresponding to m terminal devices and a cross-resource event notification criterion; and receiving the cross-resource event notification from the subscription service entity, wherein the cross-resource event notification is transmitted in response to n resources of the m resources satisfying respective single-resource event notification criteria and the subscription service entity determining that the cross-resource event notification criterion is satisfied, wherein a numerical value of n is a positive integer smaller than the numerical value of m.

The embodiments of the present disclosure provide a system for transmitting cross-resource event notifications, comprising: an apparatus for transmitting cross-resource event notifications, the apparatus being a subscription service device; a resource subscription entity configured to transmit a cross-resource subscription request to the subscription service device; an application entity configured to transmit a resource operation request to the subscription service device; the apparatus for transmitting cross-resource event notifications including: a cross-resource subscription unit configured to receive the cross-resource subscription request from the resource subscription entity, wherein the cross-resource subscription request is used to subscribe to a plurality of resources, and the cross-resource subscription request includes a plurality of single-resource event notification criteria and a cross-resource event notification criterion; a notification unit configured to determine that n resources of m resources satisfy the single-resource event notification criteria and satisfy the cross-resource event notification criterion, and transmit a cross-resource event notification to the resource subscription entity, wherein m and n are positive integers greater than or equal to 2.

The embodiments of the present disclosure provide an electronic device for transmitting cross-resource event notifications. The electronic device for transmitting cross-resource event notifications includes a processor and a memory. The memory has stored thereon computer instructions which, when executed by the processor, implement the method for transmitting cross-resource event notifications as described above.

The embodiments of the present disclosure provide a computer-readable storage medium having stored thereon computer instructions which, when executed by a processor, implement the method for transmitting cross-resource event notifications as described above.

BRIEF DESCRIPTION OF DRAWINGS

In order to illustrate technical solutions of the embodiments of the present disclosure more clearly, the drawings of the embodiments will be briefly introduced below. Obviously, the drawings described below merely relate to some embodiments of the present disclosure but do not limit the present disclosure.

In order to illustrate technical solutions of the embodiments of the present disclosure more clearly, the drawings needed to be used in the description of the embodiments will be briefly introduced below. The drawings in the following description are merely exemplary embodiments of the present disclosure.

FIGS. 6B-6C illustrates use cases of a plurality of terminal devices.

FIG. 7 illustrates a schematic diagram of another example method for transmitting cross-resource event notifications according to an embodiment of the present disclosure.

FIG. 8 illustrates a schematic diagram of a schematic diagram of an example method for receiving the cross-resource event notifications according to an embodiment of the present disclosure.

DETAILED DESCRIPTION

Figure 1A:
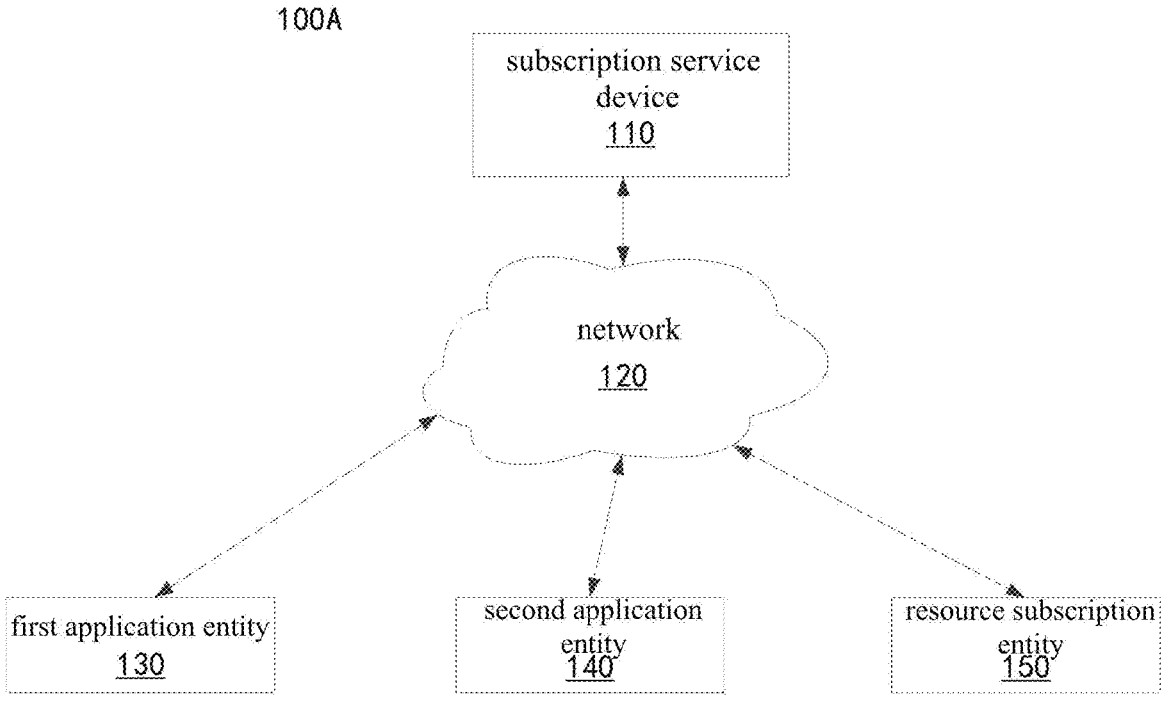
FIG. 1A illustrates a schematic diagram of a scenario in which cross-resource event notifications are transmitted.

In order to make the objects, technical solutions, and advantages of the present disclosure more obvious, detailed descriptions of the exemplary embodiments according to the present disclosure will be made in the following with reference to the accompanying drawings. Obviously, the described embodiments are merely part of embodiments of the present disclosure, not all embodiments of the present disclosure. It should be understood that the present disclosure is not limited by the exemplary embodiments described herein.

Throughout the present specification and drawings, substantially identical or similar steps and elements are denoted by identical or similar reference numerals, and repetitive descriptions of these steps and elements will be omitted. Meanwhile, in the description of the present disclosure, terms such as "first", "second" and the like are merely used to distinguish among descriptions, while cannot be understood as indicating or implying relative importance or ranking.

Throughout this specification, the term "entity" may represent hardware such as IoT apparatuses, IoT gateways, or IoT servers, or the term "entity" may represent software components of the IoT application layer or IoT (public) service layer.

Throughout the present specification, an application entity (AE), a common service entity (CSE), data, and the like may be expressed as resources. In the IoT, a data structure that may be uniquely addressed utilizing a unique address (e.g., URI (Uniform Resource Identifier)) is referred to as a resource. In an IoT system, resources may be expressed as specific data structures, and resources may be logically connected with each other. Therefore, the IoT apparatuses, IoT gateways, AEs, CSEs, or the public service layer of IoT servers may each include resources.

Various resources are defined in the IoT system. The IoT applications may conduct communications based on instantiated resources as resource types. For example, resources may be used for IoT services such as registration of applications, reading of sensor values, etc. When instances of corresponding resource types are generated, unique address information (e.g., URIs) may be given to the respective resource.

Optionally, a resource may have sub-resources and attributes. Attributes store information about the resource itself, and may not include sub-resources. A sub-resource may include attributes and its own sub-resources. For example, the sub-resources may be remote CSE resources, application entity resources, access control resources, container resources, group resources, subscription resources, etc.

Figure 1B:
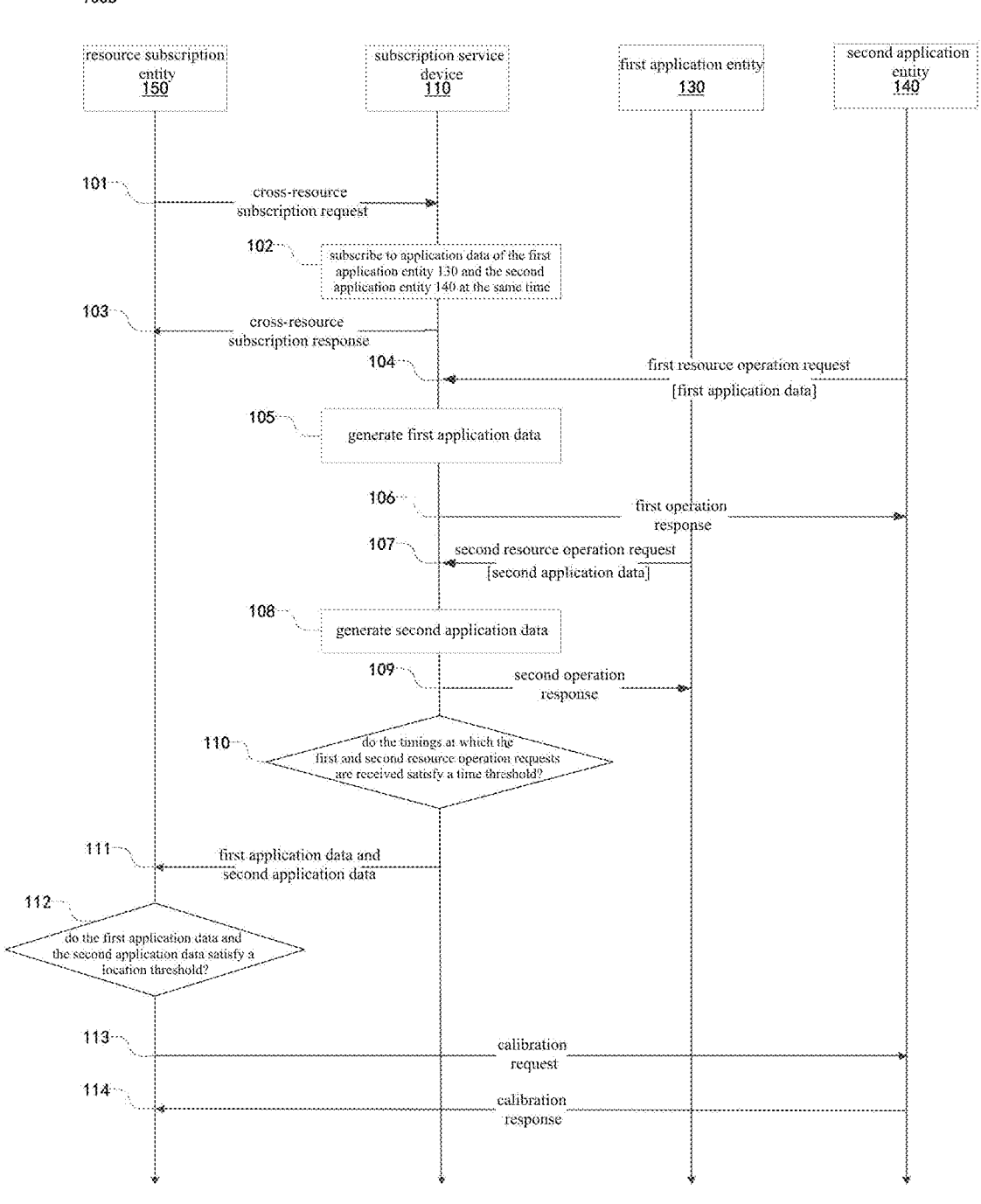
FIG. 1B illustrates a schematic diagram of an interaction process between apparatus participating in transmitting cross-resource event notifications.

FIG. 1A illustrates a schematic diagram of a scenario 100A in which cross-resource event notifications are transmitted. FIG. 1B illustrates a schematic diagram of an interaction process 100B between apparatuses participating in transmitting cross-resource event notifications.

Referring to FIG. 1A, in scenario 100A, a subscription service device 110, a first application entity 130, a second application entity 140 and a resource subscription entity 150 may be connected through network 120. The above devices may communicate with each other directly or indirectly, for example, transmit and receive data and/or signals to/from each other through the network 120.

Network 120 may be an Internet of Things (IoT) based on the Internet and/or telecommunication network, which may be a wired network or a wireless network. For example, it may be an electronic network, such as a local area network (LAN), a metropolitan area network (MAN), a wide area network (WAN), a cellular data communication network, etc., which enables information exchange functions.

Through network 120, the subscription service device 110 may centrally manage and control the application entities (e.g., the first application entity 130 and the second application entity 140). The subscription service device 110 may also transmit a cross-resource event notification to the resource subscription entity 150 through network 120 to inform the application entity of a resource change state. Specifically, the subscription service device 110 may be a server or other electronic device including a processor and a memory. The subscription service device 110 may also be a common service entity (CSE) in the IoT.

The resource entity 150 and the application entities may be a computing device including a processor and a memory. For example, the first application entity 130 and the second application entity 140 may be a television, smart home appliance (e.g., smart refrigerator, smart microwave oven, etc.), smart car, desktop computer, notebook computer, smartphone, tablet computer, music player (e.g., mp3 player, etc.) and other terminals including a processor and a memory (e.g., mobile terminal, smart terminal). In some embodiments, the first application entity 130 is a fixed monitoring device and the second application entity 140 is a mobile monitoring device, which may be used for monitoring of the surrounding environment (e.g., monitoring of conditions such as temperature, humidity, illumination, and the like of the surrounding environment). In some embodiments, the resource subscription entity 150 and the application entities may be identical entities or different entities. For example, the resource subscription entity 150, the first application entity 130, and the second application entity 140 may be application entities (AEs) in the IoT. Of course, the resource subscription entity 150, the first application entity 130, and the second application entity 140 may also be common service entities.

For example, in the IoT, an AE (or CSE) may be registered to another CSE. After successful registration, resources corresponding to the AE (or CSE) would be created on the CSE. The AE may operate on resources on the CSE by operations such as creating, updating, acquiring, deleting, etc. Specifically, resources may include attributes and sub-resources, in which the attributes are used to store information related to resources (e.g., resource identifiers, physical locations of AEs corresponding to resources, state information of resources, etc.), the sub-resources are resources at the next level of the resources, and the resources include indexes pointing to resources at the next level.

In some embodiments, an operator operates (e.g., edits a resource subscription request) at the resource subscription entity 150, transmits a resource subscription request to the subscription service device 110, and in turn, receives a notification transmitted by the subscription service device 110 in a case where a resource changes. The notification may indicate the case where the resource changes.

For example, FIG. 1B illustrates a typical interaction process 100B for resource subscription.

In operation 101, the resource subscription entity 150 transmits, to the subscription service device 110, a cross-resource subscription request, which is used to subscribe to application data of the first application entity 130 and the second application entity 140 at the same time, and sets a cross-resource event notification criterion as "the application data of both is transmitted when a time interval between when application data is transmitted by the first application entity 130 and when application data is transmitted by the second application entity 140 satisfies a time threshold".

After receiving the cross-resource subscription request, the subscription service device 110 completes an operation of subscribing to the application data of the first application entity 130 and the second application entity 140 at the same time in operation 102 and automatically transmits a cross-resource event notification to the resource subscription entity 150 when the above cross-resource event notification criterion is satisfied. Thereafter, the subscription service device 110 will transmit a cross-resource subscription response to the resource subscription entity 150 in operation 103, informing the resource subscription entity 150 that it has successfully set the cross-resource subscription. Specifically, the subscription service device 110 may utilize information related to the first application entity 130 and the second application entity 140 to build in its interior a first resource corresponding to the first monitoring device 130 and a second resource corresponding to the second monitoring device 140, and manipulate the first monitoring device 130 and the second monitoring device 140 over the first resource and the second resource.

The operator may also operate on an application entity to transmit a resource operation request to the subscription service device 110. Of course, the application entity may also automatically transmit the resource operation request to the subscription service device 110 without human intervention. For example, in operation 104, the second application entity 130 may transmit a first resource operation request including first application data to the subscription service device 110. In operation 105, the subscription service device 110 records the first application data according to the first resource operation request and records a first timing which the first resource operation request is received. In operation 106, the subscriber server 110 transmits a first operation response to the second application entity 140.

Similarly, in operations 107-109, second application data and a second timing which the second application data is received may also be acquired through a second resource operation request between the first application entity 130 and the subscription service device 110.

In operation 110, the subscription service device 110 determines whether a time difference between the first timing and the second timing satisfies a time threshold. If the time threshold is satisfied, the subscription service device 110 transmits the first application data and the second application data to the resource subscription entity 150 in operation 111. Then, in operation 112, the resource subscription entity 150 may further process the first application data and the second application data. For example, the resource subscription entity 150 may determine whether a distance between a first location where the first application data is acquired and a second location where the second application data is acquired satisfies a requirement for a location threshold. When the first location and the second location satisfy the requirement for a location threshold, the resource subscription entity 150 may transmit a calibration request in operation 113 to inform the second application entity 140 that it should perform a calibration operation based on the first application data and the second application data. After completing the calibration, the second application entity 140 may return a calibration response to the resource subscription entity 150 in operation 114.

In the interaction process 100B, since the locations of the first application entity 130 and the second application entity 140 may be constantly changing, the subscription service device 110 cannot determine a locational relationship between the first application entity 130 and the second application entity 140, and thus cannot further process on events generated by the first resource and the second resource.

Specifically, assuming that the second application entity 140 is a mobile monitoring device and the first application data needs to be calibrated. The resource subscription entity 150 not only requires timing for generation of the first application data (i.e. the first timing) to be close to timing for generation of the second application data (i.e. the second timing) but also requires the distance between the first location and the second location to be relatively short. Since the subscription service device cannot determine the distance between the first location and the second location, the resource subscription entity 150 is required to further process the first application data and the second application data, thus increasing the computational burden for the resource subscription entity 150. Since the resource subscription entity 150 is typically a mobile terminal, it requires the operator to manually determine whether the first application data and the second application data may be used for calibration, thus increasing the operational burden for the operator and making it inconvenient for the operator.

Furthermore, in the interaction process 100B, the subscription service device 110 can only pay attention to a case where the first resource corresponding to the first application entity 130 and the second resource corresponding to the second application entity 140 generate events for a time threshold. However, in more scenarios, the resource subscription entity 150 may prefer to acquire a case where resources corresponding to any number of application entities of a plurality of application entities generate events. For example, assuming that there is a third application entity close to the second application entity, and when the second application entity 140 acquires the first application data, the third application entity acquires the third application data as well. At this time, the resource subscription entity 150 may wish to calibrate the second application entity 140 based on the third application data and/or the first application data. In the existing IoT system, the resource subscription entity 150 needs to transmit another cross-resource subscription request to the subscription service device 110 to subscribe to cross-resource events of the second application entity and the third application entity. This process is not only complicated but also takes up too many computational resources and storage space for the subscription service device 110 and the resource subscription entity 150, thus reducing processing efficiency for notification.

To this end, the present disclosure proposes an improved method, an apparatus, an electronic device, a computer-readable storage medium, and a system for transmitting cross-resource event notifications, which can implement transmitting a cross-resource event notification to a resource subscription entity in a case where any two or more resources of a plurality of resources satisfy a cross-resource event notification criterion, thereby satisfying requirements for user differentiation and improving processing efficiency for notification.

Figure 2A:
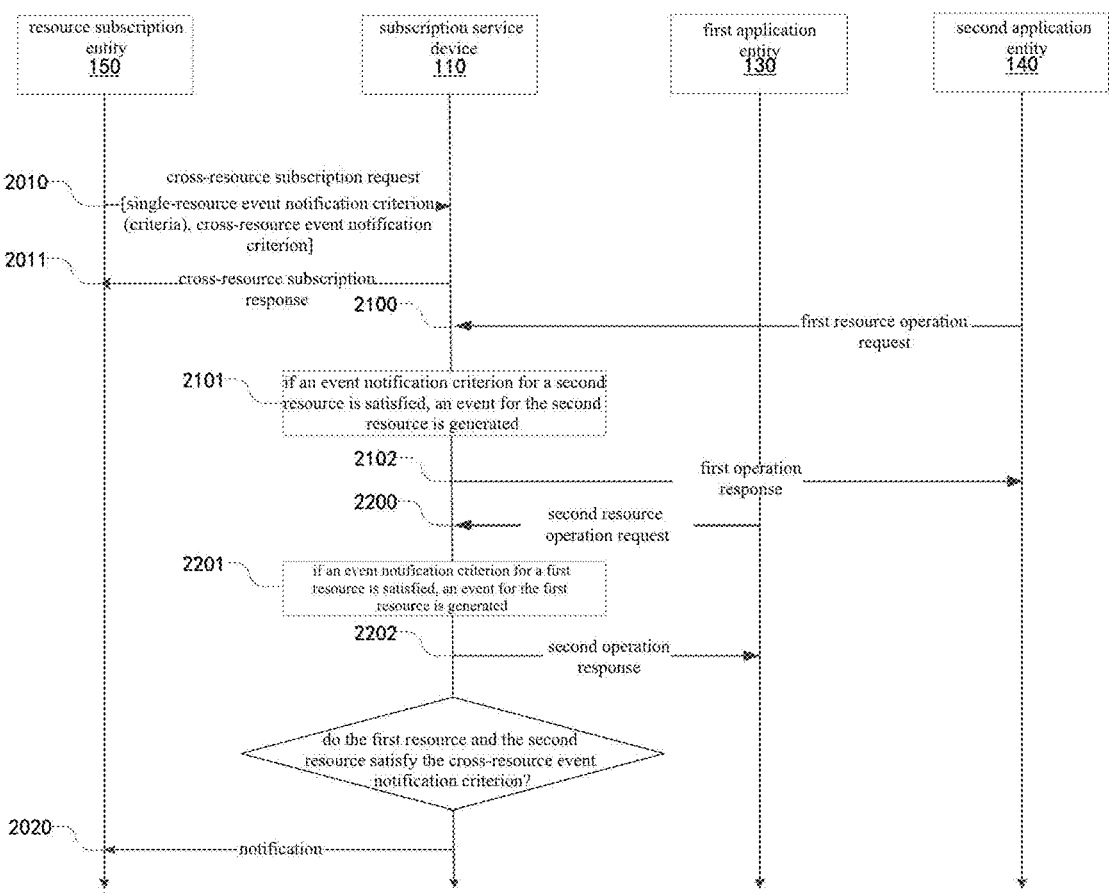
FIG. 2A illustrates a schematic diagram of a method of transmitting cross-resource event notifications according to an embodiment of the present disclosure.
Figure 2B:
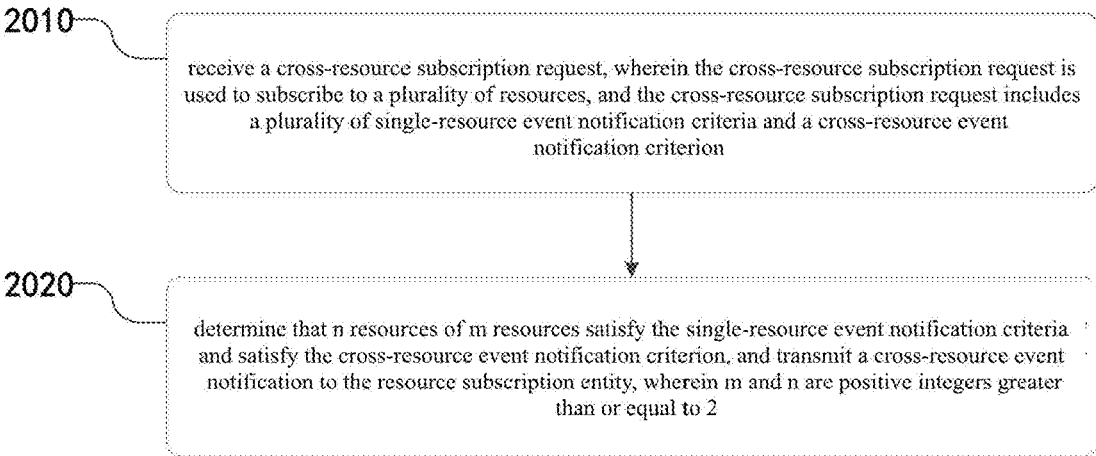
FIG. 2B illustrates a flowchart of a method of transmitting cross-resource event notifications according to an embodiment of the present disclosure.

FIG. 2A illustrates a schematic diagram of a method 200 for transmitting cross-resource event notifications according to an embodiment of the present disclosure. FIG. 2B illustrates a flowchart of method 200 for transmitting cross-resource event notifications according to an embodiment of the present disclosure.

Method 200 may include some or all of the operations shown in FIGS. 2A and 2B (e.g., some or all of operations 2010 and 2020). Of course, method 200 may further include other operations not shown in FIGS. 2A and 2B. Optionally, method 200 may be performed by the subscription service device 110. Of course, method 200 may also be performed by any other electronic device with communicational functions and computational functions. Hereinafter, the subscription service device 110 will be illustrated as an example.

Referring to FIG. 2B, in operation 2010, a cross-resource subscription request is received from the resource subscription entity 150. The cross-resource subscription request is used to subscribe to a plurality of resources. The cross-resource subscription request includes a plurality of single-resource event notification criteria and a cross-resource event notification criterion.

As shown in FIG. 2A, assuming that in the subscription service device 110, the first resource corresponds to the first application entity 130 and the second resource corresponds to the second application entity 140. The above cross-resource subscription request may be used to subscribe to a plurality of resources, including the first resource and the second resource as described above, as well as any number of other resources.

Optionally, a single-resource event notification criterion indicates a criterion under which a certain resource generates an event. Also, any resource in the subscription service device 110 has a single-resource event notification criterion corresponding to this resource. Any two single-resource event notification criteria of the above plurality of single-resource event notification criteria may be identical or different. For example, a single-resource event notification criterion may indicate that a resource subscription entity is notified when a single resource generates an event. Alternatively, the single-resource event notification criterion may further indicate that one or more operations are performed on the resource or the physical device corresponding to the resource when a single resource generates a specific event. For example, the plurality of single-resource event notification criteria of FIG. 2A may include an event notification criterion for the first resource and an event notification criterion for the second resource. The event notification criterion for the first resource and the event notification criterion for the second resource may be identical or different, which is not limited to the present disclosure. Of course, the above plurality of single-resource event notification criteria may further include event notification criteria for other resources. When any plurality of single-resource event notification criteria is identical, a plurality of events may be generated for the same resource operation request. For example, a certain operation request may indicate that the temperature data stored in both the first resource and the second resource is increased by 5%, and then event ①—in which the temperature data of the first resource is increased by 5% and event ②—in which the temperature data of the second resource is increased by 5% are generated. When two single-resource event notification criteria are different, then a plurality of resource operation requests may be required to generate a plurality of events.

For example, referring to FIG. 2B, the event notification criterion for the first resource may indicate that a notification indicating an occurrence of a change in the first resource is transmitted to the resource subscription entity 150 when any change in the first resource occurs. Assuming that the first application entity 130 transmits a second resource operation request to the subscription service device 110, and the second resource operation request indicates that a change in location of the first resource occurs.

Optionally, the resource operation request is received before the transmission of the cross-resource event notification. The resource operation request may include one or more information related to location information, application data, and operation timing. Also, based on the resource operation request, it can be determined that n resources of m resources satisfy the single-resource event notification criteria and satisfy the cross-resource event notification criterion. In this case, when the application entity is a monitoring device, the application data may be monitoring data. For example, when each application entity transmits a resource operation request including one or more information related to location information, application data, and operation timing for the application entity to the subscription service device 110, the subscription service device 110 may update the location information, application data and operation timing in the resources corresponding to these application entities according to the resource operation request, thus achieving accurately characterizing of state of application entity by the resources.

At this time, according to the event notification criterion for the first resource, the subscription service device 110 would transmit a notification of a change in location information of the first resource to the resource subscription entity 150. Of course, the event notification criterion for the first resource may further indicate other operations, such as changing at least one of resource level, location information, and state information for the first resource. The present disclosure does not limit the content of the single-resource event notification criterion.

Optionally, a cross-resource subscription event notification criterion may indicate a criterion under which n resources of a plurality of resources generate events. For example, the cross-resource subscription event notification criterion may indicate that when n resources of a plurality of resources generate events, a cross-resource event notification is transmitted to the resource subscription entity 150, or operations are performed on the n resources. For example, the cross-resource subscription event notification criterion may indicate that the cross-resource event notification is transmitted when the numerical value of application data of any two resources of a plurality of resources increases up to a specific threshold. The cross-resource subscription event notification criterion may further indicate that a distance between locations of these two resources is calculated when a change in location information of any two resources of the plurality of resources occurs. Specifically, the change in location information of a resource may indicate that a change in the physical location of an application entity corresponding to the resource occurs. Especially in a case where the application entity is a mobile device, it may be useful for the subscription service device to learn the physical location of the application entity. The present disclosure does not limit the content of the cross-resource subscription event notification criterion.

Optionally, the subscription service device 110 may also return a cross-resource subscription response to the resource subscription entity in operation 2011 after receiving the cross-resource subscription request.

In operation 2020, it is determined that n resources of m resources satisfy the single-resource event notification criteria and satisfy the cross-resource event notification criterion, and a cross-resource event notification is transmitted to the resource subscription entity, wherein m and n are positive integers greater than or equal to 2.

Specifically, the n resources satisfying the cross-resource event notification criteria as described above may include, but is not limited to, a combination of one or more of: the location information of the n resources satisfying the cross-resource event notification criterion, the value of n satisfying the cross-resource event notification criterion, the application data of the n resources satisfying the cross-resource event notification criterion, and the operation timings of the n resources satisfying the cross-resource event notification criterion. Based on this, the cross-resource event notification criterion may correspondingly indicate, but is not limited to, a combination of one or more of: a threshold for distances between locations of any two of the n resources, a threshold for n, a threshold for similarities between application data of any two of the n resources, and a threshold between operation timings of any two of the n resources.

Specifically, the distance threshold may be one or more of: the maximum distance, the minimum distance, and a distance range of distances between locations of any two of the n resources. Similarly, the threshold for n may be one or more of: the maximum value MAX, the minimum value MIN, and both the maximum value MAX and the minimum value MIN of n. The similarity threshold may be one or more of: the lowest similarity, the highest similarity, and a similarity range of similarities between application data of the n resources. The time threshold may be one or more of: the maximum value, the minimum value, or a time difference range of time differences between operation timings of any two of the n resources.

For example, the cross-resource event notification criterion may indicate a threshold for distances between locations of any two of the n resources and a threshold for similarities between application data of the n resources. Alternatively, the cross-resource event notification criterion may further indicate a threshold for n, a threshold for similarities between application data of any two of the n resources, and a time threshold for time differences between operation timings for the n resources. Of course, the n resources satisfying the cross-resource event notification criteria as described above may further include the n resources satisfying other non-mentioned cross-resource event notification criteria, which is not limited herein in the present disclosure.

Optionally, assuming that the event notification criterion for the first resource is that the application data of the first resource is updated when a change in the application data of the first resource occurs, while the event notification criterion for the second resource is that the resource subscription entity should be notified when the numerical value of the application data of the second resource increases. Further assuming that the cross-resource subscription event notification criterion indicates that a cross-resource event notification is transmitted when both numerical values of application data of any two resources of a plurality of resources increase. Referring to FIG. 2A, the second application entity 140 transmits a first resource operation request to the subscription service device 110 in operation 2100, and the first application entity 130 transmits a second resource operation request to the subscription service device 110 in operation 2200. It is assumed that the first resource operation request indicates that the numerical value of the application data of the second application entity 140 has increased by 5%, and the second resource operation request indicates that the numerical value of the application data of the first application entity 130 has increased from 60 to 75. Then in operation 2101, according to the first resource operation request, the subscription service device 110 transmits a cross-resource event notification to the resource subscription entity 150 based on the event notification criterion for the second resource. In operation 2102, the subscription service device 110 may transmit a first operation response to the second application entity 140. In operation 2201, according to the second resource operation request, the subscription service device 110 updates the application data of the first resource based on the event notification criterion for the first resource. In operation 2202, the subscription service device may return a second operation response to the first application entity 130. At this time, the first resource and the second resource also satisfy the cross-resource event notification criterion, and the subscription service device 110 may transmit a cross-resource event notification to the resource subscription entity 150 in operation 2020.

Method 200 for transmitting cross-resource event notifications according to the embodiment of the present disclosure may implement transmitting a cross-resource event notification to a resource subscription entity in a case where any two or more resources of a plurality of resources satisfy a cross-resource event notification criterion, thereby simplifying complexity for operations, meeting needs of diverse users and improving processing efficiency for messages of the system.

The method 200 for transmitting cross-resource event notifications according to an embodiment of the present disclosure is further exemplarily illustrated below.

In some embodiments, the resource operation request includes location information. The n resources satisfying the cross-resource event notification criterion further includes the location information of the n resources satisfying the cross-resource event notification criterion, wherein the cross-resource event notification criterion indicates a threshold for distances between locations of any two of the n resources.

Referring to FIG. 2A, in the above case, the subscription service device 110 receives a resource operation request including the location information of the first application entity 130 (e.g., the second resource operation request in FIG. 2A). The resource subscription entity 105 further receives a resource operation request including the location information of the second application entity 140 (e.g., the first resource operation request in FIG. 2A). The subscription service device 110 determines whether the event notification criterion for the first resource is satisfied, and if so, an event for the first resource is generated. Assuming that the event notification criterion for the first resource (that is, the single-resource event notification criterion) specifies that an event in which the location information of the first resource is updated would be generated if the location information of the first application entity 130 is received. At this time, since the location information of the first application entity 130 is included in the second operation request, then the subscription service device 110 updates the first location of the first resource based on the location information of the first application entity 130, operation 2201 in FIG. 2A). Similarly, the subscription service device 110 updates the second location of the second resource based on the location information of the second application entity 140. Since the cross-resource event notification criterion indicates a threshold for distances between locations of any two of the n resources, the subscription service device 110 calculates the distance between the first location and the second location and determines whether the cross-resource event notification criterion is satisfied or not based on this distance. For example, in a case where the distance threshold indicates the maximum distance of distances between locations of any two resources, assuming that the subscription service device 110 determines that the distance between the first location and the second location is less than the maximum distance, the subscription service device 110 transmits a cross-resource event notification to the resource subscription entity 150. For example, in a case where the distance threshold indicates the minimum distance of distances between locations of any two resources and the distance between the first location and the second location is greater than the minimum distance, the subscription service device 110 transmits a cross-resource event notification to the resource subscription entity 150. In a case where the distance threshold indicates a distance range of distances between locations of any two resources (the maximum value and the minimum value of distances between locations of any two resources) and the distance between the first location and the second location is within the distance range (greater than the minimum value in the distance range and less than the maximum value in the distance range), a cross-resource event notification is transmitted to the resource subscription entity 150. Specifically, the notification is determined according to the cross-resource event notification criterion. For example, in a case where both the first application entity 130 and the second application entity 140 are mobile environmental monitoring devices (such as temperature detection devices), the cross-resource event notification criterion may be that a cross-resource event notification is transmitted to the resource subscription entity 150 when the distance between the physical locations of the first application entity 130 and the second application entity 140 is less than the maximum distance—at this time, the temperatures detected by the first application entity 130 and the second application entity 140 may need to be calibrated. In this way, it can be guaranteed that all of the data on which the calibration is performed is generated in a certain physical range, thus guaranteeing accuracy for calibration.

In some embodiments, the n resources satisfying the cross-resource event notification criterion further comprises the value of n satisfying the cross-resource event notification criterion, wherein the cross-resource event notification criterion further indicates a threshold for n.

With continued reference to FIG. 2A, in the above case, the subscription service device 110 receives a plurality of resource operation requests (e.g., in FIG. 2A, the subscription service device 110 receives two resource operation requests in total). The subscription service device 110 determines that there are n resources that satisfy the single-resource event notification criteria based on a plurality of resource operation requests. At this time, it is assumed that the event criteria for the first resource and the fifth resource are satisfied and the event criterion for the second resource is not satisfied. The subscription service device 110 may determine that two resources satisfy the single-resource event notification criteria, that is, n is 2. Based on this, the subscription service device 110 may determine whether a total number of resources satisfies the cross-resource event notification criterion. For example, in a case where the threshold for n indicates the maximum value MAX of n and n is less than MAX, the subscription service device 110 determines that the cross-resource event notification criterion is satisfied already, and transmits a cross-resource event notification to the resource subscription entity 150. In a case where the threshold for the total number of resources indicates that the threshold for n indicates the minimum value MIN of n and n is greater than MIN, the subscription service device 110 transmits a cross-resource event notification to the resource subscription entity 150. In a case where the threshold for n indicates the maximum value MAX and the minimum value MIN of n, and n is less than MAX and n is greater than MIN, the subscription service device 110 transmits a cross-resource event notification to the resource subscription entity 150. Specifically, the notification is determined according to the cross-resource event notification criterion. For example, in a case where there are N application entities, all of which are sensors for monitoring environmental humidity, the cross-resource event notification criterion may be that a cross-resource event notification is transmitted to the resource subscription entity 150 in a case where at least M of the N application entities have monitored a change in humidity: the humidity detected by these M application entities at this time may need to be calibrated, or an average for the M values of humidity at this time may need to be calibrated. In this way, it is guaranteed that there are enough samples for calibrating data, thus guaranteeing accuracy for calibration. Therefore, it may be achieved that when Nis less than M, only one cross-resource request is created. In the above embodiments, the operation process may be simplified and the storage space of the subscription service device may be reduced, compared with the case of FIG. 1B in which a plurality of cross-resource requests are required to be created.

In some embodiments, the resource operation request includes application data. The n resources satisfying the cross-resource event notification criterion further includes the application data of the n resources satisfying the cross-resource event notification criterion, wherein the cross-resource event notification criterion further indicates a threshold for similarities between application data of any two of the n resources.

With continued reference to FIG. 2A, in the above case, the subscription service device 110 receives a resource operation request including the application data of the first application entity (e.g., the second resource operation request of operation 2200) and a resource operation request including the application data of the second application entity (e.g., the first resource operation request of operation 2100). It is assumed that the event notification criterion for the first resource (that is, the single-resource event notification criterion) specifies that an event in which the application data of the first resource is updated would be generated if the application data of the first application entity 130 is received. Then in operation 2201, the subscription service device 110 updates the first application data of the first resource based on the application data of the first application entity. Similarly, in operation 2101, the subscription service device 110 further updates the second application data of the second resource based on the application data of the second application entity. Since the cross-resource event notification criterion indicates the threshold for similarities between application data of any two of the n resources, the subscription service device 110 calculates the similarity between the first application data and the second application data, and determines whether the cross-resource event notification criterion is satisfied or not based on this similarity. For example, in a case where the similarity threshold indicates the maximum similarity of similarities between application data of any two resources, and the similarity between the first application data and the second application data is less than the maximum similarity, the subscription service device 110 may transmit a cross-resource event notification to the resource subscription entity. In a case where the similarity threshold indicates the minimum similarity of similarities between application data of any two resources, and the similarity between the first application data and the second application data is greater than the minimum similarity, the subscription service device 110 transmits a cross-resource event notification to the resource subscription entity. When the similarity threshold indicates a similarity range of similarities between application data of any two resources and the similarity between the first application data and the second application data is within the similarity range, the subscription service device 110 transmits a cross-resource event notification to the resource subscription entity. Specifically, the notification is determined according to the cross-resource event notification criterion. For example, in a case where both the first application entity 130 and the second application entity 140 are mobile environmental monitoring devices (such as temperature detection devices), the cross-resource event notification criterion may be that a notification, that the temperatures detected by the first application entity 130 and the second application entity 140 may need to be calibrated, is transmitted to the resource subscription entity 150 if the similarity between the temperature data detected by the first application entity 130 and the second application entity 140 is less than the maximum similarity. In this way, the similarity of calibration data can be ensured, and then the accuracy of calibration can be ensured.

In some embodiments, the resource operation request includes operation timings. The n resources satisfying the cross-resource event notification criterion further includes the operation timings of the n resources satisfying the cross-resource event notification criterion, wherein the cross-resource event notification criterion further indicates a time threshold for the difference between any two operation timings of the n resources.

With continued reference to FIG. 2A, in the above case, the subscription service device 110 receives a resource operation request including the operation timing of the first application entity (e.g., the second resource operation request of operation 2200) and a resource operation request including the operation timing of the second application entity (e.g., the first resource operation request of operation 2100). It is assumed that the event notification criterion for the first resource (that is, a single-resource event notification criterion) specifies that an event in which the operation timing of the first resource is updated will be generated if the operation timing of the first application entity 130 is received. Then in operation 2201, the subscription service device 110 updates the first operation timing of the first resource based on the application data of the first application entity. Similarly, in operation 2101, the subscription service device 110 further updates the second operation timing of the second resource based on the operation timing of the second application entity. Since the cross-resource event notification criterion indicates a time threshold for the difference between any two operation timings of the n resources, the subscription service device 110 calculates a difference between the first operation timing and the second operation timing, and determines whether the cross-resource event notification criterion is satisfied or not based on this the difference between the two. For example, in a case where the time threshold indicates the maximum value (hereinafter, the maximum time difference) of time differences between operation timings of any two resources, and the time difference between the first operation timing and the second operation timing is less than the maximum time difference, the subscription service device 110 may transmit a cross-resource event notification to the resource subscription entity. In a case where the time threshold indicates the minimum value (hereinafter, the minimum time difference) of time differences between operation timings of any two resources, and the time difference between the first operation timing and the second operation timing is greater than the minimum time difference, the subscription service device 110 transmits a cross-resource event notification to the resource subscription entity. In a case where the time threshold indicates a range of time difference of time differences between operation timings of any two resources, and the time difference between the first operation timing and the second operation timing is within the range of time difference, the subscription service device 110 transmits a cross-resource event notification to the resource subscription entity. Specifically, the notification is determined according to the cross-resource event notification criterion. For example, in a case where both the first application entity 130 and the second application entity 140 are mobile environmental monitoring devices (such as temperature detection devices), the cross-resource event notification criterion may be that a notification, that the temperatures detected by the first application entity 130 and the second application entity 140 are calibrated, is transmitted to the resource subscription entity 150 when the difference between the timings at which the temperature data is detected by the first application entity 130 and by the second application entity 140 is less than the maximum time difference. In this way, it may be guaranteed that all of the calibration data is generated within a certain time range, thus guaranteeing accuracy for calibration.

In some embodiments, the n resources satisfying the cross-resource event notification criterion further includes the notification content types of the n resources satisfying the cross-resource event notification criterion. In this example, the cross-resource event notification criterion further indicates that the resource subscription entity is notified to verify the application data in a case where the notification content types of any two resources of the n resources are identical; and the resource subscription entity is notified to analyze the application data correlatively in a case where the notification content types of any two resources of the n resources are different.

With continued reference to FIG. 2A, in the above case, the subscription service device 110 receives a resource operation request of the first application entity (operation 2200) and a resource operation request of the second application entity (operation 2100). The subscription service device 110 determines whether there are n resources that satisfy the single-resource event notification criteria based on a plurality of resource operation requests. In one aspect, assuming that the event notification criterion for the first resource is that the location information of the first resource is updated when the location information is included in the resource operation request of the first application entity 130. And assuming that the event notification criterion for the second resource is that the application data of the second resource is updated when the application data is included in the resource operation request of the second application entity 140. It is assumed that the event notification criteria for the first resource and the second resource are both satisfied at this time. Based on this, the subscription service device 110 may determine that the contents of notifications for the first resource and the second resource are different, so the subscription service device 110 notifies the resource subscription entity 150 to analyze the application data correlatively. Specifically, for example, in a case where both the first application entity 130 and the second application entity 140 are mobile environmental monitoring devices (such as temperature detection devices), the subscription service device 110 analyzes the rationality of the temperature data detected by the second application entity to the resource subscription entity 150 with respect to the locational relationship between the first application entity 130 and the second application entity 140. On the other hand, assuming that the event notification criterion for the first resource is that the application data of the first resource is updated when the application data is included in the resource operation request of the first application entity 130. And it is assumed that the event notification criterion for the second resource is also that the application data of the second resource is updated when the application data is included in the resource operation request of the second application entity 140. It is assumed that the event notification criteria for the first resource and the second resource are both satisfied at this time. Based on this, the subscription service device 110 may determine that the contents of notifications for the first resource and the second resource are identical, so the subscription service device 110 notifies the resource subscription entity 150 to verify the application data. Specifically, for example, in a case where the first application entity 130 is a fixed temperature monitoring device and the second application entity 140 is a mobile environmental monitoring device (such as a temperature detection device), the subscription service device 110 verifies the temperature data detected by the first application entity 130 and the second application entity 140 with the resource subscription entity 150.

Figure 3:
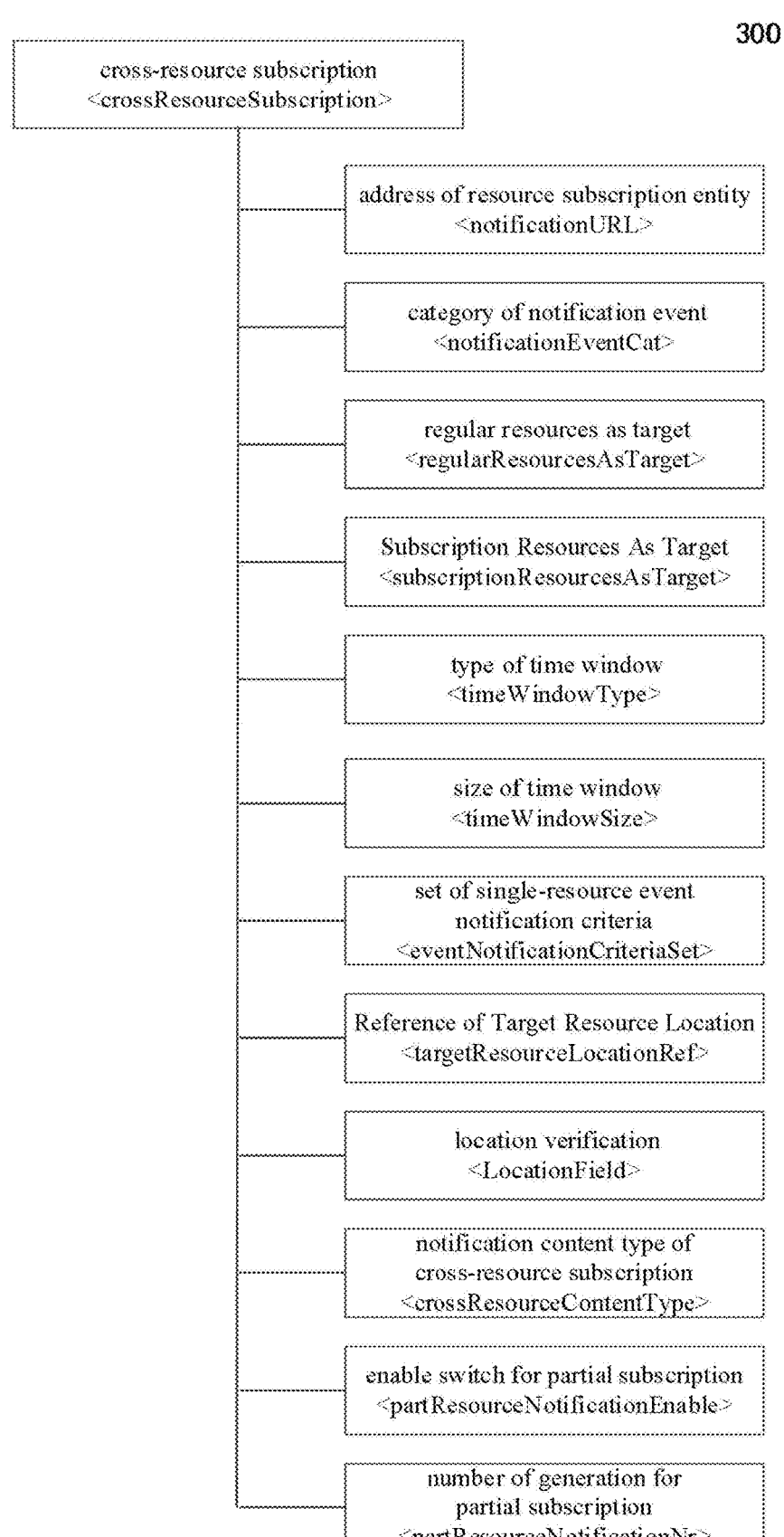
FIG. 3 illustrates a structural schematic diagram of an exemplary cross-resource subscription resource according to an embodiment of the present disclosure.

FIG. 3 illustrates a structural schematic diagram of an exemplary cross-resource subscription resource 300 according to an embodiment of the present disclosure.

After receiving a cross-resource subscription request, the subscription service device 110 creates a cross-resource subscription resource 300 (i.e., the <crossResourcesSubscription> resource in FIG. 3). For example, the cross-resource subscription resource 300 optionally includes one or more of the following content items shown in FIG. 3: address of resource subscription entity (notificationURI), category of notification event (notificationEventCat), address of subscriber (subscriberURI) (e.g., the address of the application entity), regular resources as target (regularResourcesAsTarget), subscription resources as target (subscripionResourcesAsTarget), type of time window (timeWindowType), size of time window (timeWindowSize), set of single-resource event notification criteria (eventNotificationCriteriaSet), location reference for target resource (targetResourceLocationRef), location verification (LocationRef), notification content type of cross-resource subscription (crossResourceContentType), enable switch for partial subscription (partResourceNotificationEnable) and number of generation for partial subscription (partResourceNotificationNr), etc. The cross-resource subscription resource 300 may also include other content items not shown in FIG. 3, which is not limited herein in the present disclosure.

The content items in the cross-resource subscription resource 300 are further illustrated below.

For example, the n resources satisfying the cross-resource event notification criterion in the above operation 2020 may include the location information of the n resources satisfying the cross-resource event notification criterion. In this case, the cross-resource event notification criterion indicates a maximum distance between locations of any two resources of the n resources.

To this end, the cross-resource subscription resource 300 may include a location reference and a location verification for a target resource. Specifically, the location verification may designate a certain location range or locational distance. By comparing distances between a plurality of application entities, the subscription service device 110 determines that the location information of any two resources of the n resources satisfies the cross-resource event notification criterion. The specific location information may be acquired by means of the location reference for the target resource. The location reference for the target resource indicates a location index corresponding to an AE or a CSE at which the target resource is located. For example, the location reference for the target resource may include <AE>/<locationPolicy>/locationContainerID, or <CSE>/<locationPolicy>/locationContainerID. In this example, <AE> and <CSE> resources may be used to identify the application policy for the entity.

The sub-resources of <AE> or <CSE> resources—<LocationPolicy> resources may be used to store policy for acquiring the location information of the target entities. LocationContainerID is the URI of the <container> which stores actual physical location information of a specific entity, where <container> may be used to act as a container and to store specific content information.

Figure 4:
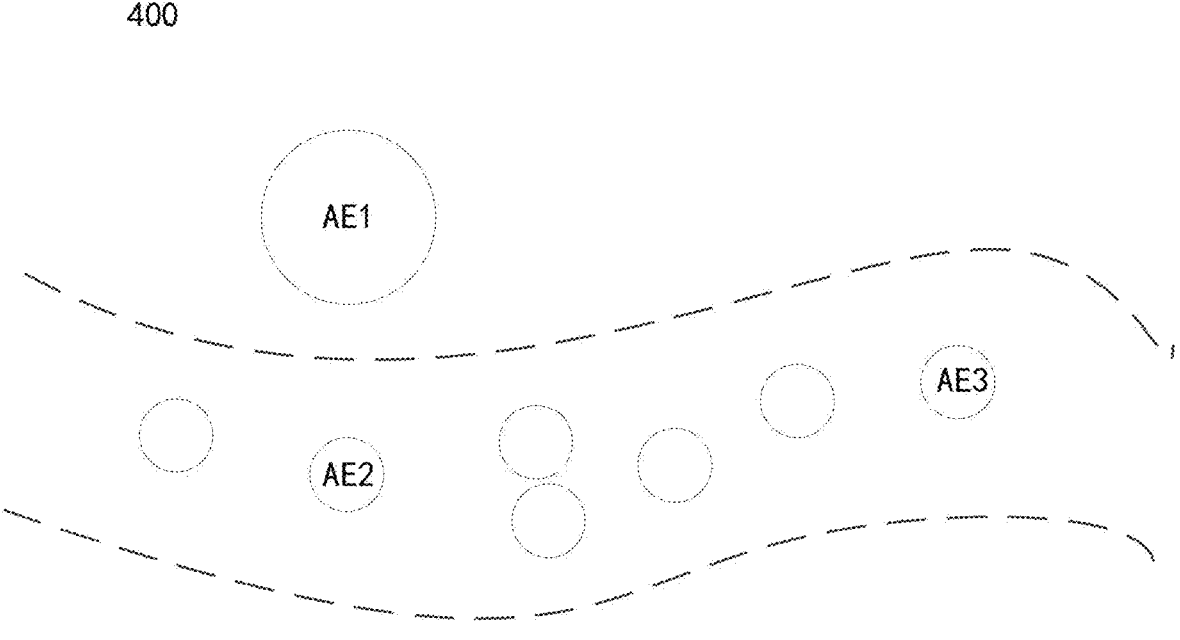
FIG. 4 illustrates a schematic diagram of one example according to an embodiment of the present disclosure.

Specifically, FIG. 4 illustrates a schematic diagram of one example 400 according to an embodiment of the present disclosure, which is used to further illustrate the cross-resource event notification criterion.

FIG. 4 illustrates 8 application entities, including: a first application entity AE1, a second application entity AE2, and a third application entity AE3. Among them, AE1 is a fixed monitoring device, and 7 application entities (e.g., AE2 and AE3) in the part in the dotted line are mobile monitoring devices. Generally, the monitoring data of fixed monitoring devices are more accurate than those of mobile monitoring devices, so the monitoring data of fixed monitoring devices may be used to calibrate the monitoring data of mobile monitoring devices. The above cross-resource event notification criterion may indicate that among the resources corresponding to the above 8 application entities if there are locations of two resources that satisfy a location threshold (assuming that the location threshold indicates a maximum distance between two resources), a cross-resource event notification is transmitted. It is assumed that AE1-AE3 each transmits a resource operation request including monitoring data to the subscription service device 110. The subscription service device 110 may acquire the specific physical locations of AE1-AE3 based on the location reference for the target resource of the cross-resource subscription resources, and calculate the distances between the three monitoring devices. By comparing these distances with the location verification, the subscription service device 110 may determine that the distance between AE1 and AE2 is less than the maximum distance of distances between locations of two resources, and in turn, may transmit a cross-resource event notification to the resource subscription entity 150 to inform that the monitoring data of AE2 may be verified by means of the monitoring data of AE1.

Compared with the interaction process between apparatuses participating in transmitting cross-resource event notifications shown in FIG. 1B, method 200 according to the embodiment of the present disclosure may directly determine the locational relationships between a plurality of application entities, and in turn, perform further processing on a plurality of resources. Therefore, the computational burden for the resource subscription entity 150 is reduced, and it is more convenient for operators to operate on the resource subscription entity 150.

For example, the n resources satisfying the cross-resource event notification criterion as described above further includes the value of n satisfying the cross-resource event notification criterion. In this case, the cross-resource event notification criterion indicates a threshold for n.

To this end, the cross-resource subscription resource 300 may include an enable switch for partial subscription (partResourceNotificationEnable) and a number of generations for partial subscription (partResourceNotificationNr). The enable switch for partial subscription indicates whether to turn on a subscription notification for partial cross-resource, which may be a binary number. When its value is 0, it means that the subscription notification for partial cross-resource is not enabled, and when its value is 1, it means that the subscription notification for partial cross-resource is enabled. The number of generations for partial subscriptions indicates the minimum number of resources for cross-resource subscription notification generation events.

Referring to FIG. 4, it is assumed that a cross-resource subscription request is used to subscribe to 8 application entities shown in FIG. 4. Also, the cross-resource subscription request sets the enable switch for partial subscription in the cross-resource subscription resource 300 to be 1, and the number of generations for partial subscription to be 3. Therefore, the cross-resource event notification criterion may indicate that a cross-resource event notification is transmitted when an update to the monitoring data of resources corresponding to more than or equal to 3 application entities of 8 application entities in FIG. 4 occurs. For example, AE1-AE3 each transmits a resource operation request to the subscription service device 110 to request an update to the monitoring data in their corresponding resources. At this time, the subscriber server 110 determines that the number of resources is equal to 3, and then transmits a cross-resource event notification to the resource subscription entity 150.

Compared with the interaction process between apparatuses participating in transmitting cross-resource event notifications shown in FIG. 1B, method 200 is only required to create one cross-resource subscription resource 300, instead of creating one cross-resource subscription resource per two resources of the 8 application entities (a total number of 28 cross-resource subscription resources). Method 200 may just acquire events generated by resources corresponding to any number of application entities of a plurality of application entities by creating one cross-resource subscription resource 300. This greatly saves computational resources and storage space and improves efficiency for notification processing.

For example, the n resources satisfying the cross-resource event notification criterion as described above further includes the application data of the n resources satisfying the cross-resource event notification criterion. In this case, the cross-resource event notification criterion indicates a threshold for similarities between application data of any two resources of the n resources. For example, in the application scenario in which a plurality of monitoring devices perform calibration in FIG. 4, the cross-resource event notification criterion may indicate that the plurality of monitoring devices may perform calibration only when the similarities between monitoring data from any number of monitoring devices of the plurality of monitoring devices are greater than the minimum similarity. For example, it is assumed that AE1-AE3 acquire first monitoring data, second monitoring data, and third monitoring data, respectively. It is assumed that the similarity between the first monitoring data and the second monitoring data is higher than the minimum similarity, a calibration may be performed on the monitoring data of AE2 based on the first monitoring data.

For example, the n resources satisfying the cross-resource event notification criterion as described above further includes the operation timings of the n resources satisfying the cross-resource event notification criterion. In this case, the cross-resource event notification criterion further indicates a time threshold for time differences between operation timings of any two resources of the n resources.

To this end, the cross-resource subscription resource 300 may include a type of time window and a size of time window. Specifically, the size of the time window may indicate the maximum value w of differences between operation timings of two resources. For example, in the scenario of FIG. 4, assuming that AE1-AE3 acquire first monitoring data, second monitoring data, and third monitoring data at times T1, T2, and T3, respectively. In a case where the difference between T1 and T3 is less than w, a calibration may be performed on the monitoring data of AE3 based on the first monitoring data.

For example, the n resources satisfying the cross-resource event notification criterion as described above further includes the notification content types of the n resources satisfying the cross-resource event notification criterion. In this case, the cross-resource event notification criterion further indicates that the resource subscription entity is notified to verify on the application data in a case where the notification content types of any two resources of the n resources are identical; and the resource subscription entity is notified to analyze the application data correlatively in a case where the notification content types of any two resources of the n resources are different.

To this end, the cross-resource subscription resources 300 may include notification content types of cross-resource subscriptions. For example, when the notification content types of two resources are monitoring data, the subscription service device 110 may use the monitoring data for calibration. When one of the notification content types of two resources is monitoring data and the other one is location data, the monitoring data and the location data may be used for correlative analysis. For example, a change in monitoring data at a certain location may be analyzed.

Figure 5:
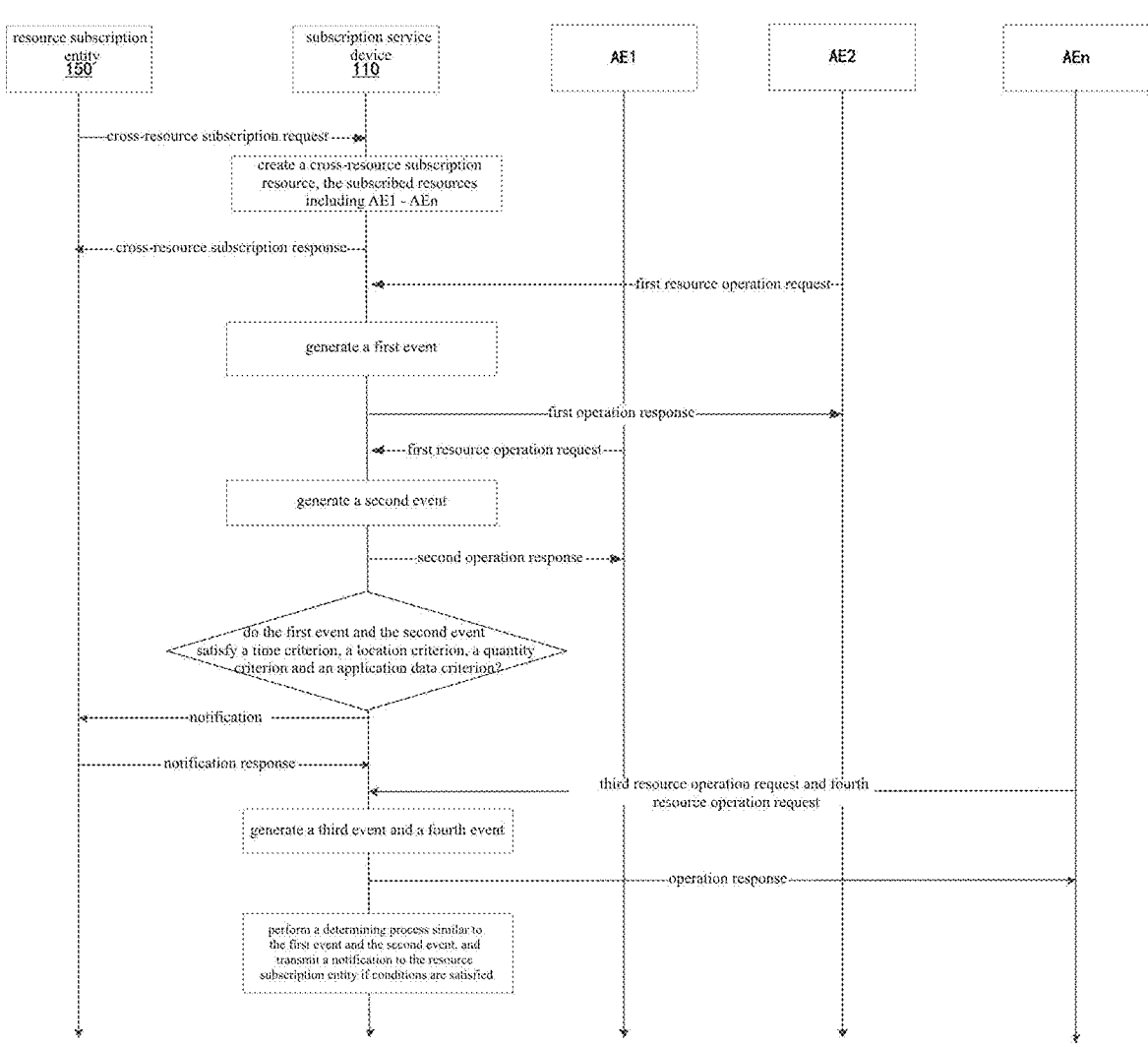
FIG. 5 illustrates a flowchart of one example according to an embodiment of the present disclosure.

FIG. 5 illustrates a flowchart of one example 500 according to an embodiment of the present disclosure.

In example 500, the resource subscription entity 150 and the application entities AE1-AEn register with the subscription service device 110.

The resource subscription entity 150 transmits a cross-resource subscription request to the subscription service device 110 including a cross-resource event notification criterion and an event notification criterion for subscribing to events generated by AE1-AEn. The cross-resource event notification criterion indicates that the subscription service device 110 creates subscription resources (including event notification criteria) for AE1-AEn when a locational separation for AE2-AEn is less than a certain location threshold and the difference between timings for event generation by AE2-AEn is less than the time threshold.

The subscription service device 110 creates a cross-resource subscription resource and returns a cross-resource subscription response.

The application entity AE2 transmits a first resource operation request in which monitoring data and location information is included.

The subscription service device 110 determines whether the monitoring data of AE2 satisfies the event notification criterion for AE2, and if so, generates a first event and returns a first operation response.

The application entity AE1 transmits a second resource operation request.

The subscription service device 110 determines whether the monitoring data of the application entity AE1 satisfies the event notification criterion for AE1, and if so, generates a second event and returns a second operation response.

The subscription service device 110 determines whether a first event and a second event satisfy the cross-resource event notification criteria, that is, whether the first event and the second event satisfy the following four conditions: ① whether the location information corresponding to the first event and the second event is less than a certain location threshold; ② whether the time information corresponding to the first event and the second event is less than a certain time threshold; ③ whether the similarity between the application data corresponding to the first event and the second event is greater than a certain similarity threshold; and ④ whether the sum of the number of events corresponding to the first event and the second event is greater than a certain threshold for a total number of resources, and if the first event and the second event correspondingly satisfy the above four conditions, a cross-resource event notification is transmitted to the resource subscription entity 150.

After receiving the notification, the resource subscription entity 150 may return a notification response to the subscription service device 110. The resource subscription entity 150 may further transmit a verification request to the application entity AE2 and receive a verification response transmitted by the application entity AE2.

The subscription service device 110 further receives a third resource operation request and a fourth resource operation request transmitted by application entities AE4 and AE5, in which monitoring data and location information are included.

The subscription service device 110 determines whether the monitoring data of the application entities AE4 and AE5 satisfy the event notification criteria and if so, generates a third event and a fourth event, and returns an operation response.

The subscription service device 110 determines whether the third event and the fourth event satisfy the cross-resource event notification criteria and if so, transmits a cross-resource event notification to the resource subscription entity 150.

Figure 6A:
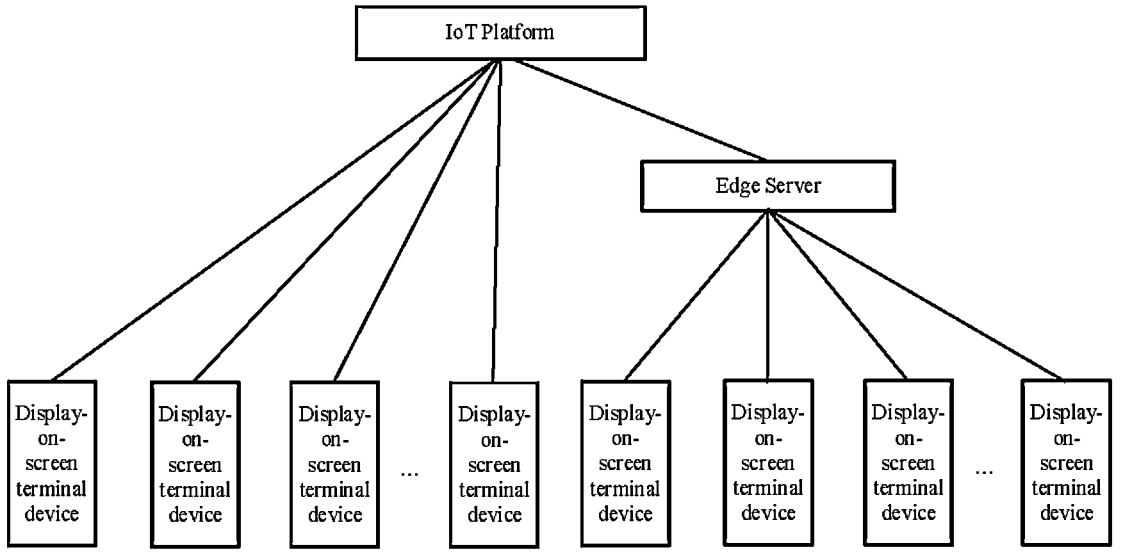
FIG. 6A illustrates an example of Internet of Things system in which a plurality of terminal devices are managed.

In some implementations, with the development of Internet of Things technology and display technology, more and more terminal devices have the display function and become display-on-screen terminal devices, which can realize human-computer interaction. In order to facilitate the control of the display-on-screen terminals, centralized control is realized by connecting the display-on-screen terminal devices to the Internet of Things (IoT) platform. The display-on-screen terminal devices may report data to the Internet of Things platform and receive instructions sent by the Internet of Things platform. In some scenarios, the Internet of Things platform can be deployed on the edge side, such as deployed at an edge server. The edge server may act as the Internet of Things platform to receive data from the display-on-screen terminal devices and send instructions to the display-on-screen terminal devices. The edge server can interact with the Internet of Things platform in the cloud, such as reporting data and receiving models. An example of Internet of Things system is illustrated in the FIG. 6A. In FIG. 6A, the system include a plurality of the display-on-screen terminal devices, and a part of the display-on-screen terminal devices are communicated directly to the Internet of Things platform in the cloud and another part of the display-on-screen terminal devices are communicated directly to the edge server, which is communicated with the Internet of Things platform in the cloud. Display-on-screen terminal devices may be used in many fields, such as exhibition, home, commercial display, etc. In these fields, there are many display-on-screen terminal devices in a certain spatial region. For example, in a retail store, as in FIG. 6B, the display-on-screen terminal devices are used to display information of different commodities, and the display content data of each terminal device is similar or is of a same type. For another example, in a living room, as in FIG. 6C, the display-on-screen terminal devices are used to display different art works having a same topic/theme, that is, the display content data of each terminal device is similar or is of a same topic/theme. In an exhibition hall, the display-on-screen terminal devices are used to display the art works (not shown).

Therefore, although the plurality of display-on-screen terminal devices are independent terminal devices, and they can be independently connected to the Internet of Things platform (and/or the edge server), and can independently send information to and receive the contents of the Internet of Things platform (and/or the edge server). However, due to the strong correlation of the contents of the plurality of display-on-screen terminal devices in a specific scene, the plurality of display-on-screen terminal devices need to be managed as a whole.

There may be different anomalies in the plurality of display-on-screen terminal devices, such as the startup anomaly of some display-on-screen terminal devices, the content display anomaly of some display-on-screen terminal devices, content synchronization anomaly of some display-on-screen terminal devices, and/or the device status anomaly of some display-on-screen terminal devices. The above anomalies need to be fed back to the IoT platform through cross-resource subscription (and/or the edge server). The IoT platform in the cloud and the edge server which may serve as the IoT platform may communicate with each other, so they may be collectively referred to as "the IoT platform" for managing all the display-on-screen terminal devices.

Therefore, FIG. 7 illustrates a schematic diagram of another example method for transmitting cross-resource event notifications according to an embodiment of the present disclosure, which may be used for the scenario including a plurality of display-on-screen terminal devices.

Optionally, method 700 may be performed by the subscription service device 110 as shown in FIG. 1A, FIG. 1B, FIG. 2A, etc. Of course, method 700 may also be performed by any other electronic device with communicational functions and computational functions. Hereinafter, the subscription service device 110 will be illustrated as an example.

In operation 710, registration requests of m terminal devices are acquired, and a resource for each of the m terminal devices is created respectively, to obtain m resources, where a numerical value of m is an integer greater than or equal to 2.

For example, the m terminal devices may each be the application entity 130 or 140 shown in FIG. 1A.

In an example, the m terminal devices may each be a display-on-screen terminal device with a display screen for displaying content information, and each display-on-screen terminal device may transmit a registration request for registrating on the subscription service device, so that the subscription service device may create the resource for the display-on-screen terminal device.

For example, device-related data of each display-on-screen terminal device may be required, and then stored in a respective resource of the m resources, and the device-related data may include at least one of device status data, display parameter data and display content data.

Optionally, the device status data may include operating temperature, power on or shut down, or other parameter that represents the operation status, etc. The display parameter data may include display brightness, display resolution, display contrast, or frame rate, etc. The display content data may include display data classification or attribute, e.g., a specific type and/or a specific theme (e.g, food type, painting for exhibition, etc.)

Optionally, the resource creating operation for each terminal device may be similar to the method as mentioned before, such as in the description of FIG. 1A.

In some cases, the created resources for the m terminal devices may be grouped into a resource group at the subscription service device, e.g., in response to a group creating request from a resource subscription device.

In operation 720, a cross-resource subscription request is acquired from a resource subscription entity, where the cross-resource subscription request comprises a single-resource event notification criterion for each of the m resources and a cross-resource event notification criterion.

For example, the resource subscription entity may be the resource subscription entity 150 in FIG. 1A, or may also be any other application entity.

In operation 730, the cross-resource event notification criterion being satisfied is determined in response to n resources among the m resources satisfying respective single-resource event notification criteria, and transmitting the cross-resource event notification to a resource subscription entity, where a numerical value of n is a positive integer smaller than the numerical value of m.

As mentioned in combination of FIG. 2A and FIG. 2B, a single-resource event notification criterion indicates a criterion under which a certain resource generates an event. A cross-resource subscription event notification criterion may indicate a criterion under which some or all of a plurality of resources generate events.

For example, the cross-resource subscription event notification criterion may indicate that when there are a minimum or maximum number of resources of the m resources generating events, a cross-resource event notification should be transmitted to the resource subscription entity 150, or operations are performed on the resources which generate events. For example, the cross-resource event notification criterion may indicate a maximum value MAX or a minimum value MIN of the numerical value of n. In some example, n represents an actual number of normal terminal devices (whether a terminal device is normal is determined according to the corresponding single-resource event notification criterion of the resource corresponding to the terminal device), when the numerical value of n is smaller than the minimum value MIN, the cross-resource event notification is generated and transmitted; otherwise, in some other examples, n represents an actual number of abnormal terminal devices, and when the numerical value of n is greater than the maximum value MAX, the cross-resource event notification is generated and transmitted.

In an example, when each terminal device is the display-on-screen terminal device, and the device-related data of each display-on-screen terminal device is stored in a respective resource of the m resources, determining that the cross-resource event notification criterion is satisfied comprises: determining that the cross-resource event notification criterion is satisfied in a case where the device status data of the n display-on-screen terminal devices of the m display-on-screen terminal devices satisfies respective single-resource event notification criteria, or in a case where the display parameters of the n display-on-screen terminal devices of the m display-on-screen terminal devices satisfy respective single-resource event notification criteria, or in a case where the display contents of the n display-on-screen terminal devices of the m display-on-screen terminal devices satisfy respective single-resource event notification criteria.

For the display-on-screen terminal devices, the single resource event notification criterion for each resource of the m resources comprises at least one of: device status data, display parameter data or display content data of a display-on-screen terminal corresponding to the resource is abnormal (e.g., overheat, shut down, operate abnormally); display parameter data (e.g., display brightness, display resolution, display contrast, or frame rate, etc.) of the display-on-screen terminal corresponding to the resource is greater than the corresponding display parameter threshold; or deviation of display parameter data of the display-on-screen terminal corresponding to the resource relative to an average display parameter data of the m display-on-screen terminal devices is greater than a first deviation threshold or a first deviation threshold ratio; or deviation of the display parameter data of the display-on-screen terminal device corresponding to the resource relative to the display parameter data of most of the m display-on-screen terminal devices is greater than a second deviation threshold or a second deviation threshold ratio; display content data of the display-on-screen terminal device corresponding to the resource is data of a specific type and/or a specific theme (e.g, food type, painting for exhibition, etc.); display content data of the display-on-screen terminal device corresponding to the resource is not data of a specific type and/or a specific theme.

As shown in Table 1, the display parameter data of each display-on-screen terminal device may include different display parameters, e.g., display brightness, display resolution, display contrast, or frame rate, and the average value for each display parameter with respect to a device group consisting of 3 display-on-screen terminal devices (i.e., m=3) is calculated. For any display parameter of the display parameters, when the deviation of the display parameter value of a display-on-screen terminal device relative to the average display parameter value of the m display-on-screen terminal devices is greater than a second deviation threshold or a second deviation threshold ratio, the resource corresponding to the display-on-screen terminal device satisfies a respective single-resource event notification criterion.

TABLE 1

| Average values | display-on-screen terminal device 1 | display-on-screen terminal device 2 | display-on-screen terminal device 3 |
|---|---|---|---|
| resolution: 2.66K | resolution: 2K | resolution: 3K | resolution: 3K |
| brightness: 933 | brightness: 1000 | brightness: 900 | brightness: 900 |
| contrast: 334,266:1 | contrast: 1,000,000:1 | contrast: 1400:1 | contrast: 1400:1 |
| frame rate: 108 | frame rate: 144 | frame rate: 90 | frame rate: 90 |

From Table 1, assuming the deviation threshold ratio (for average value case) is set to 10%, it may be seen that there are 3 terminal devices which have abnormal display parameters (illustrated underlined in the table), therefore, all the 3 resources corresponding to the 3 terminal devices satisfy respective single-resource event notification criteria (thus the cross-resource subscription criterion is satisfied). That is, if the 3 terminal devices display with apparently different and inconsistent display parameters, the visual effect will be not good, then the notification should be transmitted to an application entity (e.g., an APP installed on the management personnel).

Accordingly, FIG. 8 illustrates a schematic diagram of a schematic diagram of an example method for receiving the cross-resource event notifications according to an embodiment of the present disclosure, which may be used for the scenario including a plurality of display-on-screen terminal devices.

Optionally, method 800 may be performed by the resource subscription entity 150 as shown in FIG. 1A, FIG. 1B, FIG. 2A, etc. Of course, method 800 may also be performed by any other electronic device with communicational functions and computational functions. Hereinafter, the resource subscription entity 150 will be illustrated as an example.

In operation 810, a cross-resource subscription request is transmitted to a subscription service entity, where the cross-resource subscription request comprises a single-resource event notification criterion for each of the m resources respectively corresponding to m terminal devices and a cross-resource event notification criterion.

As described with reference to FIG. 7, the m terminal devices each are a display-on-screen terminal device with a display screen for displaying content information, and device-related data of each display-on-screen terminal device is stored in a respective resource of the m resources at the subscription service entity, and the device-related data includes at least one of device status data, display parameter data and display contents data.

In operation 820, the cross-resource event notification is received from the subscription service entity, where the cross-resource event notification is transmitted in response to n resources of the m resources satisfying respective single-resource event notification criteria and the subscription service entity determining that the cross-resource event notification criterion is satisfied, wherein a numerical value of n is a positive integer smaller than the numerical value of m.

As described with reference to FIG. 7, the subscription service entity transmits the cross-resource event notification when determining that the cross-resource event notification criterion is satisfied. Details of the operation are similar to the description of FIG. 7, which are omitted here.

Figure 9:
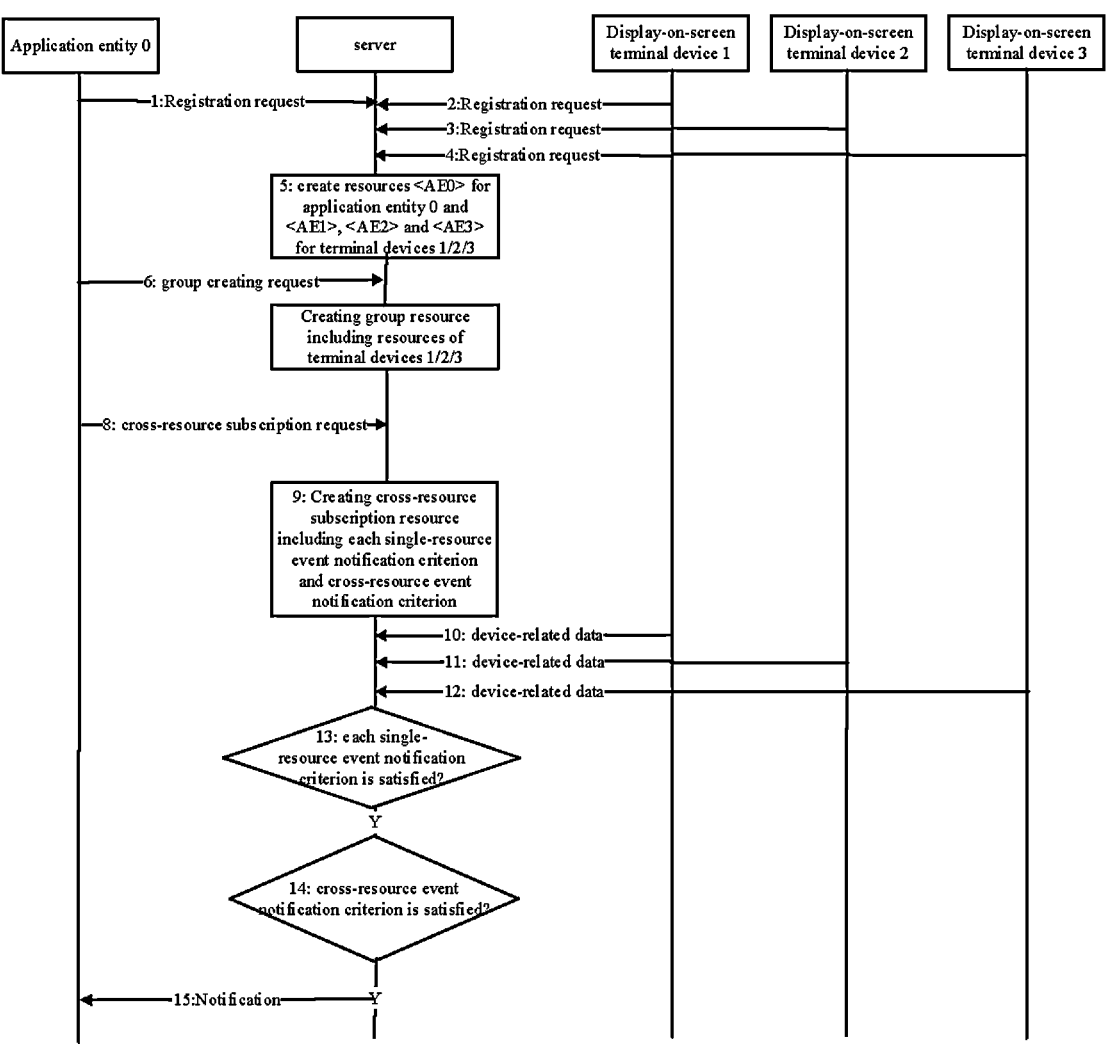
FIG. 9 illustrates a schematic diagram of an interaction process between apparatuses participating in transmitting the cross-resource event notification based on the methods of FIG. 7 and FIG. 8.

FIG. 9 illustrates a schematic diagram of an interaction process between apparatuses participating in transmitting the cross-resource event notification based on the methods of FIG. 7 and FIG. 8.

In processes 1, 2, 3 and 4, the application entity 0 and display-on-screen terminal devices 1, 2 and 3 register with the server (an example of the subscription service device).

In process 5, the server creates corresponding resources for the application entity and the display-on-screen terminal devices 1, 2 and 3, such as creating resource <AE0> for the application entity and resources <AE1>, <AE2> and <AE3> for the display-on-screen terminal devices 1, 2 and 3, respectively.

In process 6, optionally, the application entity sends a group creating request indicating to create a device group to the server, and in process 7, the server creates a group resource according to the group creating request, and the created group resource includes resources corresponding to the display-on-screen terminal devices 1, 2 and 3;

In process 8, the application entity sends a cross-resource subscription request to the server, which includes a single-resource event notification criterion for each of resources respectively corresponding to display-on-screen terminal devices 1, 2 and 3 and a cross-resource event notification criterion. In process 9, the server creates the cross-resource subscription resource which includes each single-resource event notification criterion and the cross-resource event notification criterion.

In processes 10-12, display-on-screen terminal devices 1, 2 and 3 each send device-related data (e.g., operating temperature, display brightness, display resolution, display contrast, or frame rate, display content data, etc.) to the server respectively.

In process 13, the server determines whether the device-related data stored in each resource satisfies the respective single-resource event notification criterion. For example, all the single-resource event notification criteria for all the display-on-screen terminal devices 1, 2 and 3 are the same, and the single-resource event notification criterion may include whether the operating temperature is higher than 50 degrees, may include whether deviation of display brightness of the display-on-screen terminal corresponding to each resource relative to an average display brightness of the 3 display-on-screen terminal devices is greater than a first deviation threshold or a first deviation threshold ratio (e.g., 10% of the average display brightness), or may include whether display content data of the display-on-screen terminal corresponding to the resource is data of a specific type and/or a specific theme, etc.

In some cases, some single-resource event notification criteria may be different. For example, the single-resource event notification criterion for the resource corresponding to terminal device 1 relates to the operating temperature, and the single-resource event notification criterion for the resource corresponding to terminal device 2 relates to display brightness.

In process 14, the server determines whether the device-related data stored in at least two resources corresponding to at least two of the display-on-screen terminal devices 1, 2 and 3 in the device group satisfies their corresponding subscription criteria (whether n is greater than the MIN (herein, 2)), in order to determine whether the cross-resource subscription criterion is satisfied, and transmits a cross-resource event notification to the application entity in the process 15, if the cross-resource subscription criterion is satisfied. In this case, the cross-resource subscription criterion may include: resources of at least 2 display-on-screen terminal devices satisfy respective single-resource event notification criteria.

Based on the method 700 and method 800, and in combination of the interaction process of FIG. 9, for a plurality of terminal devices, when only a part of terminal devices satisfy respective single-resource event notification criteria, it may be determined that the cross-resource event notification criterion is satisfied, without all the terminal devices satisfying respective single-resource event notification criteria, which may implement the management of the plurality of terminal devices at the IoT platform, reduce the communication resources because of the addition of the cross-resource event notification criterion and also respond to the event occurrence timely (the notification may be transmitted when only a part of terminal devices satisfy respective single-resource event notification criteria).

In some scenarios, there may be multiple device groups, that is, a first device group may include a first plurality of terminal devices, and a second device group may include a second plurality of terminal devices. For example, a first plurality of display-on-screen terminal devices are deployed in a first shop, and a second plurality of display-on-screen terminal devices are deployed in a second shop, and all these terminal devices are register with the same subscription service entity (e.g., IoT platform), so that subscription service entity is capable of managing these terminal devices together. For example, the subscription service entity may receive location information from each of all the terminal devices, and based on the received location information, the subscription service entity may determine which terminal devices are located in a same spatial region or in a predetermined spatial region (e.g., in a same shop).

Optionally, resources of terminal devices included in each device group may be created as one resource group at the subscription service entity.

When there are two or more device groups, the subscription service entity may generate the cross-resource event notification for each device group, and thus there may be two or more cross-resource event notifications for the subscription service entity to transmit. Therefore, in this case, it needs to determines which cross-resource event notification should be transmit firstly.

In some example, the cross-resource event notification criterion may include a notification priority criterion for determining a priority of the cross-resource event notification. That is, the (first) cross-resource event notification criterion for the first device group may be assigned to a first priority, and the (second) cross-resource event notification criterion for the second device group may be assigned to a second priority.

Optionally, in a first case, when the cross-resource subscription criterion indicates the maximum value MAX, which means that only n is greater than or equal to the MAX, the notification is transmitted, the priority of each cross-resource event notification is positively related to the number of resources which satisfy respective single-resource event notification criteria and thus the cross-resource event notification criterion is satisfied, or positively related to a ratio of the number of resources (which satisfy respective single-resource event notification criteria and thus the cross-resource event notification criterion is satisfied) divided by the number of all the resources. For example, the first device group may be formed by the above-mentioned m terminal devices, and the first priority is positively related to the numerical value of n or n/m. Similarly, the second device group may include p terminal devices, and p resources are created, q resources of p resources satisfy respective single-resource event notification criteria and thus the second cross-resource event notification criterion is satisfied, then the second priority is positively related to the numerical value of q or the q/p. For example, the first priority may be defined as n−1 or n/m, as shown in Table 2.

TABLE 2

| cross-resource event notification criterion | Priority (n − 1) | Priority (n/m) |
|---|---|---|
| 2 terminal devices satisfy respective single-resource event notification criteria | 1 | Rounding (2/m*10) |
| 3 terminal devices satisfy respective single-resource event notification criteria | 2 | Rounding (3/m*10) |
| N terminal devices satisfy respective single-resource event notification criteria | N − 1 | Rounding (N/m*10) |

Similarly, in a second case, when the cross-resource subscription criterion indicates the minimum value MIN, which means that only n is smaller than or equal to the MIN, the notification is transmitted, the priority of each cross-resource event notification is negatively related to the number of resources which satisfy respective single-resource event notification criteria and thus the cross-resource event notification criterion is satisfied, or negatively related to a ratio of the number of resources (which satisfy respective single-resource event notification criteria and thus the cross-resource event notification criterion is satisfied) divided by the number of all the resources.

In another example, for the first device group, a range of 0 to the numerical value of m is divided into a plurality of numerical intervals, and each numerical interval corresponds to a different priority. The notification priority criterion may include: the priority corresponding to a numerical interval where the numerical value of n is located is determined as the priority of the cross-resource event notification. For the second device group, the second priority may be determined similarly.

In this way, for example, in the first case, the higher the number of terminal devices that satisfy respective single-resource event notification criteria (and thus the cross-resource event notification criterion is satisfied), the higher the priority of the cross-resource event notification. When two or more cross-resource event notifications need to be transmitted, the server can send cross-resource event notifications according to the priorities thereof. For example, if a shop has three terminal devices operating abnormally and another shop has two terminal devices operating abnormally, for both shops, cross-resource event notifications need to be transmitted to the application entity, and the server can send cross-resource event notification corresponding to the shop including three terminal devices operating abnormally according to the priority firstly, and the application entity may also process the cross-resource events according to the priorities of these cross-resource event notifications.

Figures 10, 11:
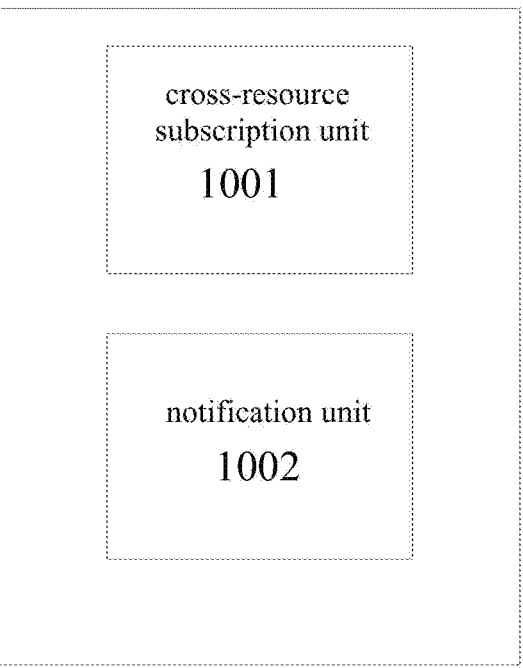
FIG. 10 illustrates a schematic diagram of an apparatus for transmitting cross-resource event notifications according to an embodiment of the present disclosure.
FIG. 11 illustrates a structural diagram of an electronic device for transmitting cross-resource event notifications according to an embodiment of the present disclosure.

FIG. 10 illustrates a schematic diagram of an apparatus 1000 for transmitting cross-resource event notifications according to an embodiment of the present disclosure.

A system for transmitting cross-resource event notifications may include: an apparatus for transmitting cross-resource event notifications, the apparatus being a subscription service device; a resource subscription entity configured to transmit a cross-resource subscription request to the subscription service device; an application entity configured to transmit a resource operation request to the subscription service device. The apparatus 1000 for transmitting cross-resource event notifications includes a cross-resource subscription unit 1001 and a notification unit 1002.

The cross-resource subscription unit 1001 is configured to receive a cross-resource subscription request from the resource subscription entity. The cross-resource subscription request is used to subscribe to a plurality of resources, which includes event notification criteria for each of the plurality of resources and cross-resource event notification criteria.

The notification unit 1002 is configured to transmit a cross-resource event notification to the resource subscription entity in a case where n resources of the plurality of resources satisfy the single-resource event notification criteria and the n resources satisfy the cross-resource event notification criteria.

In some other examples, the cross-resource subscription unit 1001 may be configured to: acquire registration requests of m terminal devices, and creating a resource for each of the m terminal devices, respectively, to obtain m resources, wherein a numerical value of m is an integer greater than or equal to 2, and acquire a cross-resource subscription request from a resource subscription entity, wherein the cross-resource subscription request comprises a single-resource event notification criterion for each of the m resources and a cross-resource event notification criterion. The notification unit 1002 may configured to: determine that the cross-resource event notification criterion is satisfied in response to n resources among the m resources satisfying respective single-resource event notification criteria, and transmit the cross-resource event notification to a resource subscription entity, wherein a numerical value of n is a positive integer smaller than the numerical value of m.

FIG. 11 illustrates a structural diagram of an electronic device 1100 for transmitting cross-resource event notifications according to an embodiment of the present disclosure.

Referring to FIG. 11, an electronic device 1100 for transmitting cross-resource event notifications may include a processor 1101 and a memory 1102. Both the processor 1101 and the memory 1102 may be interconnected through a bus 1103. The electronic device 1100 may be a tower server, rack server, blade server, cabinet server, etc.

The processor 1101 may perform various actions and processes according to programs stored in memory 1102. Specifically, the processor 1101 may be an integrated circuit chip with processing capability for signal. The above processor may be a general-purpose processor, digital signal processor (DSP), application-specific integrated circuit (ASIC), field programmable gate array (FPGA) or other programmable logic devices, discrete gate or transistor logic device, and discrete hardware component. The methods, steps, and logic block diagrams disclosed in the embodiments of the present application may be implemented or executed. The general-purpose processor may be a microprocessor or any conventional processor, which may be based on X86 architecture or ARM architecture.

The memory 1102 stores computer instructions which, when executed by the processor 1101, implement the above methods 200, 700 and 800 for transmitting cross-resource event notifications. The memory 1102 may be a volatile memory or a nonvolatile memory, or may include both volatile memory and nonvolatile memory. The nonvolatile memory may be read-only memory (ROM), programmable read-only memory (PROM), erasable programmable read-only memory (EPROM), electrically erasable programmable read-only memory (EEPROM) or flash memory. The volatile memory may be random access memory (RAM), which is used as an external cache. By way of example but not limitation, many forms of RAMs are available, such as static random access memory (SRAM), dynamic random access memory (DRAM), synchronous dynamic random access memory (SDRAM), double data rate synchronous dynamic random access memory (DDRSDRAM), enhanced synchronous dynamic random access memory (ESDRAM), synchronous connection dynamic random access memory (SLDRAM) and direct memory bus random access memory (DR RAM). It should be noted that the memory in the method described herein is intended to include, but not limited to, these and any other suitable types of memory.

The present disclosure further provides a system for transmitting cross-resource event notifications. The system for transmitting cross-resource event notifications may include a subscription service device 110, a resource subscription entity 150, and application entities (such as a first application entity 130 and a second application entity 140) as shown in FIGS. 1A and 1B. The resource subscription entity 150 is configured to transmit a cross-resource subscription request to the subscription service device. The application entity is configured to transmit a resource operation request to the subscription service device.

The present disclosure further provides a computer-readable storage medium having stored thereon computer instructions which, when executed by a processor, may implement the above methods 200, 700 and 800 for transmitting cross-resource event notifications. Similarly, the computer-readable storage medium in the embodiments of the present disclosure may be volatile memory or nonvolatile memory, or may include both volatile memory and nonvolatile memory. It should be noted that the computer-readable storage medium described herein is intended to include, but not limited to, these and any other suitable types of memories.

The present disclosure provides an improved method, apparatus, electronic device, computer-readable storage medium and system for transmitting cross-resource event notifications. The method, apparatus, electronic device, computer-readable storage medium and system for transmitting cross-resource event notifications may process complicated event information generated by partial resources of a plurality of resources, and in turn efficiently process information notification.

It should be noted that the flowcharts and block diagrams in the accompany drawings illustrate architectures, functions and operations for possible implementations of systems, methods and computer program products according to various embodiments of the present disclosure. In this regard, each block in the flowcharts or block diagrams may represent a module, program segment, or part of code, which contains one or more executable instructions for implementing specified logical functions. It should also be noted that in some alternative implementations, the functions noted in the blocks may also occur in a different order than that noted in the accompany drawings. For example, two blocks shown in succession can actually be executed substantially in parallel, and sometimes they can be executed in a reverse order, depending on the functions involved. It should also be noted that each block in the block diagram and/or flowchart, and combinations of blocks in the block diagram and/or flowchart, can be realized by means of a dedicated hardware-based system that performs specified functions or operations, or can be realized by a combination of dedicated hardware and computer instructions.

Generally speaking, various exemplary embodiments of the present disclosure can be implemented in hardware or dedicated circuits, software, firmware, logic, or any combination thereof. Some aspects can be implemented in hardware, while other aspects can be implemented in firmware or software that may be executed by a controller, microprocessor or other computing device. When various aspects of embodiments of the present disclosure are illustrated or described as block diagrams, flowcharts or some other graphical representations, it will be understood that the blocks, apparatuses, systems, technologies or methods described herein can be implemented as non-limiting examples in hardware, software, firmware, special-purpose circuits or logic, general-purpose hardware or controllers or other computing devices, or some combination thereof.

The exemplary embodiments of the present invention as described above in detail are merely illustrative, not restrictive. Those skilled in the art should understand that various modifications and combinations can be made to these embodiments or their features without departing from the principle and spirit of the present invention, and such modifications should fall within the scope of the present invention.

The above descriptions are only exemplary embodiments of the present disclosure, and is not intended to limit the scope of protection of the present disclosure, which is determined by the appended claims.

The invention claimed is:

1. A method of transmitting a cross-resource event notification, comprising:
   acquiring registration requests of m terminal devices, and creating a resource for each of the m terminal devices, respectively, to obtain m resources, wherein a numerical value of m is an integer greater than or equal to 2;
   acquiring a cross-resource subscription request from a resource subscription entity, wherein the cross-resource subscription request comprises a single-resource event notification criterion for each of the m resources and a cross-resource event notification criterion; and determining that the cross-resource event notification criterion is satisfied in response to n resources among the m resources satisfying respective single-resource event notification criteria, and transmitting the cross-resource event notification to a resource subscription entity, wherein a numerical value of n is a positive integer smaller than the numerical value of m,
   wherein the m terminal devices each are a display-on-screen terminal device with a display screen for displaying content information; and
   wherein the device-related data each display-on-screen terminal device is stored into a respective resource of the m resources, and is used for determining whether the single resource event notification criterion for the respective resource is satisfied.

2. The method according to claim 1, wherein the device-related data includes at least one of device status data, display parameter data and display content data.

3. The method according to claim 2, wherein determining that the cross-resource event notification criterion is satisfied comprises:
   determining that the cross-resource event notification criterion is satisfied in a case where the device status data of the n display-on-screen terminal devices of the m display-on-screen terminal devices satisfies respective single-resource event notification criteria; or
   determining that the cross-resource event notification criterion is satisfied in a case where the display parameter data of the n display-on-screen terminal devices of the m display-on-screen terminal devices satisfies respective single-resource event notification criteria; or
   determining that the cross-resource event notification criterion is satisfied in a case where the display content data of the n display-on-screen terminal devices of the m display-on-screen terminal devices satisfies respective single-resource event notification criteria.

4. The method according to claim 2, wherein the single resource event notification criterion for each resource of the m resources comprises at least one of:
   device status data, display parameter data or display content data of a display-on-screen terminal corresponding to the resource is abnormal;
   display parameter data of the display-on-screen terminal corresponding to the resource is greater than the corresponding display parameter threshold; or
   deviation of display parameter data of the display-on-screen terminal corresponding to the resource relative to an average display parameter data of the m display-on-screen terminal devices is greater than a first deviation threshold or a first deviation threshold ratio; or
   deviation of the display parameter data of the display-on-screen terminal corresponding to the resource relative to the display parameter data of most of the m display-on-screen terminal devices is greater than a second deviation threshold or a second deviation ratio;
   display content data of the display-on-screen terminal corresponding to the resource is data of a specific type and/or a specific theme;
   display content data of the display-on-screen terminal corresponding to the resource is not data of a specific type and/or a specific theme.

5. The method of claim 1, further comprising:
   receiving location information of each of m terminal devices;
   determining that the m terminal devices are located within a predetermined spatial region based on the location information of each of the m terminal devices.

6. The method of claim 5, further comprising:

including the m resources corresponding to the m terminal devices to a resource group.

7. The method according to claim 1, wherein the cross-resource event notification criterion indicates a maximum value MAX or a minimum value MIN, wherein the numerical value of n is greater than the maximum value MAX; or the numerical value of n is smaller than the minimum value MIN.

8. The method according to claim 1, wherein the cross-resource event notification criterion includes a notification priority criterion for determining a priority of the cross-resource event notification.

9. The method according to claim 8, wherein the priority of the cross-resource event notification is positively related to the numerical value of n.

10. A method of transmitting a cross-resource event notification, comprising:

acquiring registration requests of m terminal devices, and creating a resource for each of the m terminal devices, respectively, to obtain m resources, wherein a numerical value of m is an integer greater than or equal to 2;

acquiring a cross-resource subscription request from a resource subscription entity, wherein the cross-resource subscription request comprises a single-resource event notification criterion for each of the m resources and a cross-resource event notification criterion; and determining that the cross-resource event notification criterion is satisfied in response to n resources among the m resources satisfying respective single-resource event notification criteria, and transmitting the cross-resource event notification to a resource subscription entity, wherein a numerical value of n is a positive integer smaller than the numerical value of m;

wherein the cross-resource event notification criterion includes a notification priority criterion for determining a priority of the cross-resource event notification;

wherein: i) a range of 0 to the numerical value of m is divided into a plurality of numerical intervals, and each numerical interval corresponds to a different priority; and the notification priority criterion includes: the priority corresponding to a numerical interval where the numerical value of n is located as the priority of the cross-resource event notification or ii) the priority of the cross-resource event notification is positively related to a ratio of the numeral value of n divided by the numeral value of m.

11. A method of receiving a cross-resource event notification, comprising:

transmitting a cross-resource subscription request to a subscription service entity, wherein the cross-resource subscription request comprises a single-resource event notification criterion for each of the m resources respectively corresponding to m terminal devices and a cross-resource event notification criterion; and receiving the cross-resource event notification from the subscription service entity, wherein the cross-resource event notification is transmitted in response to n resources of the m resources satisfying respective single-resource event notification criteria and the subscription service entity determining that the cross-resource event notification criterion is satisfied, wherein a numerical value of n is a positive integer smaller than the numerical value of m, wherein the m terminal devices each are a display-on-screen terminal device with a display screen for displaying content information; and wherein the device-related data each display-on-screen terminal device is stored into a respective resource of the m resources, and is used for determining whether the single resource event notification criterion for the respective resource is satisfied.

12. The method according to claim 11, wherein the device-related data includes at least one of device status data, display parameter data and display contents data, the single resource event notification criterion for each resource of the m resources comprises at least one of:

device status data, display parameter data or display content data of a display-on-screen terminal corresponding to the resource is abnormal;

display parameter data of the display-on-screen terminal corresponding to the resource is greater than the corresponding display parameter threshold; or deviation of display parameter data of the display-on-screen terminal corresponding to the resource relative to an average display parameter data of the m display-on-screen terminal devices is greater than a first deviation threshold; or deviation of the display parameter data of the display-on-screen terminal corresponding to the resource relative to the display parameter data of most of the m display-on-screen terminal devices is greater than a second deviation threshold;

display content data of the display-on-screen terminal corresponding to the resource is data of a specific type and/or a specific theme;

display content data of the display-on-screen terminal corresponding to the resource is not data of a specific type and/or a specific theme.

13. The method according to claim 11, wherein the cross-resource event notification criterion includes a notification priority criterion for determining a priority of the cross-resource event notification.

14. The method of claim 13, wherein the priority of the cross-resource event notification is positively related to the numerical value of n.

15. The method of claim 13, further comprising:

when cross-resource event notifications with different priorities are received, cross-resource events are processed in the order from high priority to low priority.

16. An electronic device for transmitting a cross-resource event notification, comprising:

one or more processors;

one or more memories storing computer instructions which, when executed by the one or more processor, implement the method for transmitting a cross-resource event notification as claimed in claim 1.

* * * * *